(12) United States Patent
Suzuki et al.

(10) Patent No.: US 9,904,982 B2
(45) Date of Patent: Feb. 27, 2018

(54) SYSTEM AND METHODS FOR DISPLAYING PANORAMIC CONTENT

(71) Applicant: NINTENDO CO., LTD., Kyoto (JP)

(72) Inventors: Toshiaki Suzuki, Kyoto (JP); Satoshi Kira, Kyoto (JP); Akihiro Umehara, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 652 days.

(21) Appl. No.: 14/282,710

(22) Filed: May 20, 2014

(65) Prior Publication Data
US 2014/0354683 A1 Dec. 4, 2014

(30) Foreign Application Priority Data

May 31, 2013 (JP) .................. 2013-114890

(51) Int. Cl.
*G06T 3/40* (2006.01)
*G06F 17/30* (2006.01)
(Continued)

(52) U.S. Cl.
CPC ............ *G06T 3/4038* (2013.01); *G06F 17/30* (2013.01); *G06T 3/0037* (2013.01);
(Continued)

(58) Field of Classification Search
CPC ........ H04N 13/0429; G06F 2200/1614; G06F 17/30; G06F 17/2207; G06F 17/20212; G06T 19/006
See application file for complete search history.

(56) References Cited

U.S. PATENT DOCUMENTS

| | | | | |
|---|---|---|---|---|
| 5,942,969 A | * | 8/1999 | Wicks | A63F 13/12 273/454 |
| 6,320,495 B1 | * | 11/2001 | Sporgis | A63F 13/12 273/459 |

(Continued)

FOREIGN PATENT DOCUMENTS

JP    2011-076249    4/2011

OTHER PUBLICATIONS

Google Maps Street View "Explore the world at street level", searched on Feb. 20, 2013, http://maps.google.com/intl/en/help/maps/streetview/.

(Continued)

*Primary Examiner* — Michelle L Sams
(74) *Attorney, Agent, or Firm* — Nixon & Vanderhye, P.C.

(57) ABSTRACT

An example of an information processing system displays, on a display device, a plurality of panoramic images associated with locations on a map. Here, a predetermined virtual object is set for at least one of the plurality of panoramic images. an information processing system 1 determines one of the locations on the map as a current location based on a user operation. Where the virtual object is set for a panoramic image associated with the current location, the virtual object is placed at a predetermined position of the panoramic image. The information processing system 1 displays, on the display device, an image of a partial area of the panoramic image associated with the current location. A predetermined information process is performed in response to satisfaction of a predetermined condition regarding the virtual object while the panoramic image for which the virtual object is set is displayed.

24 Claims, 15 Drawing Sheets

(51) Int. Cl.
  *G06T 19/00* (2011.01)
  *G06T 3/00* (2006.01)
  *H04N 13/04* (2006.01)

(52) U.S. Cl.
  CPC .... *G06T 19/006* (2013.01); *G06F 2200/1614* (2013.01); *G06T 2207/20212* (2013.01); *H04N 13/0429* (2013.01)

(56) References Cited

U.S. PATENT DOCUMENTS

| | | |
|---|---|---|
| 9,251,561 B2 | 2/2016 | Furumura et al. |
| 2002/0090985 A1* | 7/2002 | Tochner ................. A63F 13/12 463/1 |
| 2007/0027591 A1* | 2/2007 | Goldenberg ........ G06F 17/3087 701/23 |
| 2009/0215471 A1* | 8/2009 | Sands ................... G01S 13/876 455/457 |
| 2011/0141141 A1* | 6/2011 | Kankainen ......... G01C 21/3647 345/632 |
| 2011/0283223 A1* | 11/2011 | Vaittinen ............ G01C 21/3647 715/781 |
| 2012/0190455 A1* | 7/2012 | Briggs ................... H04L 67/38 463/42 |
| 2012/0200665 A1 | 8/2012 | Furumura et al. |
| 2012/0240077 A1* | 9/2012 | Vaittinen ............. G06F 3/04815 715/781 |
| 2013/0173154 A1* | 7/2013 | Wither ............... G01C 21/3635 701/532 |
| 2013/0178257 A1* | 7/2013 | Langseth ................ G06T 17/05 463/4 |
| 2014/0118479 A1* | 5/2014 | Rapoport ........... H04N 1/00183 348/36 |
| 2014/0172640 A1* | 6/2014 | Argue ................ G06Q 30/0641 705/26.61 |
| 2016/0100104 A1 | 4/2016 | Furumura et al. |

OTHER PUBLICATIONS

"Ability of the Street View", [online], <http://maps.google.co.jp/intl/ja/help/maps/streetview/learniusing-street-view.html>; printed Dec. 6, 2016, and English-language translation of same.

* cited by examiner

SYSTEM AND METHODS FOR DISPLAYING PANORAMIC CONTENT

CROSS REFERENCE TO RELATED APPLICATIONS

The disclosure of Japanese Patent Application No. 2013-114890 filed on May 31, 2013 is herein incorporated by reference.

FIELD

The present technique relates to a storage medium storing a panoramic image display program for displaying a panoramic image, a panoramic image display device, a panoramic image display system, and a panoramic image display method.

BACKGROUND AND SUMMARY

There are conventional techniques in which a panoramic images representing the real world are used, and an image of a real space is displayed while changing the line-of-sight direction in response to a user operation.

The conventional techniques only allowed panoramic images to be viewed, leaving room for improvement in view of presenting more-entertaining panoramic image content.

Thus, the present disclosure provides a storage medium storing a panoramic image display program, a panoramic image display device, a panoramic image display system, and a panoramic image display method capable of presenting highly-entertaining panoramic images.

(1)

An example of a storage medium described in the present specification is a non-transitory computer-readable storage medium storing a panoramic image display program to be executed on a computer of an information processing device for displaying, on a display device, a plurality of panoramic images associated with locations on a map. A predetermined virtual object is set for at least one of the plurality of panoramic images. The panoramic image display program causes the computer to execute: determining a current location; placing a virtual object at a predetermined position of the panoramic image; displaying an image on the display device; and performing a predetermined information process.

The computer determines one of the locations on the map as a current location based on a user operation. Where the virtual object is set for a panoramic image associated with the current location, the computer places the virtual object at a predetermined position of the panoramic image. The computer displays, on the display device, an image of a partial area of the panoramic image associated with the current location, wherein the partial area is determined in response to a user operation. The computer performs a predetermined information process in response to satisfaction of a predetermined condition regarding the virtual object while the panoramic image for which the virtual object is set is displayed.

With configuration (1) above, the information process is performed when a condition regarding the object is satisfied as a result of the user changing the line-of-sight direction while moving the location. Thus, the user can not only view panoramic images, but also enjoy an interactive experience through finding objects. Therefore, an information processing system 1 can provide a highly-entertaining panoramic image.

(2)

The computer may obtain data of a panoramic image provided in advance in the information processing device or another information processing device, obtain data of the virtual object provided in advance in the information processing device or another information processing device, and display, on the display device, the image of the partial area of the panoramic image using the obtained data.

With configuration (2) above, the data of the panoramic image and the data of the virtual object may be provided (stored) in advance in a single information processing device, or may be provided (stored) in advance in separate information processing devices.

With configuration (2) above, by using the object provided in advance, it is possible to easily display the object together with the panoramic image.

(3)

A virtual object may be set for each of two or more of the plurality of panoramic images. The predetermined information process may be performed in response to satisfaction of a predetermined condition regarding a plurality of predetermined virtual objects.

With configuration (3) above, the predetermined information process is performed in response to satisfaction of a condition regarding objects placed in a plurality of locations. Then, since the user performs operations while taking into consideration paths to take through a plurality of locations where objects are placed, it is possible to provide a more-entertaining panoramic image.

(4)

The predetermined information process may be performed on a condition that the virtual object is displayed on the display device.

With configuration (4) above, the predetermined information process is performed in response to the user not only having arrived at the location in which the target object is set but also having directed the line-of-sight direction toward the target object. Then, the user is required not only to simply move the viewpoint, but also to move the line-of-sight direction while moving the viewpoint, thereby making the content using panoramic images more entertaining.

(5)

The predetermined information process may be performed at least on a condition that the user performs an operation of specifying the virtual object displayed on the display device.

With configuration (5) above, since the predetermined information process is performed in response to the user having actually specified the object, it is possible to more reliably determine whether the user has discovered the object.

(6)

The predetermined information process may be performed on a condition that a panoramic image for which a virtual object is set is displayed.

With configuration (6) above, by determining whether the current location is the location where the object is placed, it is possible to easily determine the condition for performing the predetermined information process.

(7)

A virtual object set for a panoramic image may be displayed together with the panoramic image on a condition that a line-of-sight direction corresponding to an area of the panoramic image to be displayed is a direction within a predetermined range.

With configuration (7) above, the object is not always displayed only with the current location having arrived at the location where the object is placed. Therefore, in order to discover the object, the user is required not only to simply move the viewpoint but also to move the line-of-sight direction while moving the viewpoint. Therefore, it is possible to make the content using panoramic images more entertaining.

(8)

The panoramic image display program may cause the computer to further execute displaying suggestion information on the display device together with the panoramic image, wherein the suggestion information suggests a position of the virtual object on the map or on a panoramic image.

With configuration (8) above, as the suggestion information suggesting the position of the object is presented to the user, it is possible to make the content using panoramic images more entertaining.

(9)

A suggestion object may be displayed, as the suggestion information, at a position on the panoramic image determined based on a position of the virtual object on the map.

Note that the phrase "a position on the panoramic image determined based on a position of the object on the map" may be a position as follows calculated from the position of the object on the map.
  a position determined based on the path from the current location to the location where the object is placed (the path is calculated from the position of the object).
  a position determined based on the direction from the current location to the position of the object on the map (or the location where the object is placed) (the direction is calculated from the position of the object).

With configuration (9) above, with the placement position of the suggestion object, the user can know the direction in which the user should proceed in order to move to the position of the object.

(10)

A suggestion object suggesting a position of the virtual object on a panoramic image may be displayed as the suggestion information. The suggestion object may indicate a direction toward the virtual object from a position of the suggestion object on the panoramic image.

With configuration (10) above, with the direction indicated by the suggestion object, the user can know the direction toward which the line-of-sight direction should be changed in order to have the object displayed.

(11)

The virtual object may be erased when a predetermined condition regarding the virtual object is satisfied.

With configuration (11) above, since the virtual object for which the predetermined condition is satisfied is erased, it appears to the user that the virtual object has been obtained, thereby notifying the user that the condition has been satisfied in an easy-to-understand manner. Moreover, since the virtual object is erased, the panoramic image can be provided in an easier-to-view manner.

(12)

A process of giving the user a bonus related to a panoramic image may be performed as the predetermined information process.

With configuration (12) above, by giving the user a bonus, it is possible to improve the level of entertainment of the panoramic image.

(13)

The virtual object may be associated with a location different from a location associated with the panoramic image for which the virtual object is set. An information process of selecting a location associated with the virtual object in response to satisfaction of a predetermined condition regarding the virtual object, and displaying, on the display device, a panoramic image associated with the selected location instead of the panoramic image for which the virtual object is set may be performed.

With configuration (13) above, the viewpoint of the panoramic image moves to another location in response to satisfaction of the condition regarding the object displayed together with the panoramic image. Placing such an object makes it easier to move to a distant location on the map, and allows the user to feel as if the viewpoint warped, thus providing a highly-entertaining panoramic image.

(14)

A virtual object which is set for a panoramic image associated with another location different from the current location may be defined as an other-location virtual object, and an additional virtual object representing the other-location virtual object as viewed from a viewpoint of the panoramic image in the current location may be displayed on the display device together with the panoramic image associated with the current location.

With configuration (14) above, even if the current location is not the location where the other-location object is placed, the position and/or direction of the other-location object from the current location can be notified to the user through the additional object.

(15)

The panoramic image display program may cause the computer to further execute determining an placement position of the additional virtual object for the panoramic image associated with the current location based on a direction toward the other location from the current location on the map.

With configuration (15) above, with the placement position of the additional object, the user can recognize the direction of the other-location object as viewed from the current location.

(16)

The placement position of the additional virtual object for the panoramic image associated with the current location may be determined based on a positional relationship on the map between a viewpoint of the other location and the other-location virtual object.

With configuration (16) above, with the placement position of the additional object, it is possible to more accurately express the direction of the other-location object from the viewpoint of the current location.

(17)

The placement position of the additional virtual object for the panoramic image associated with the current location may be determined based on a distance from the current location to the other location, wherein the distance is calculated based on information indicating positions of the current location and the other location on the map.

With configuration (17) above, with the placement position of the additional object, it is possible to more accurately express the direction of the other-location object from the viewpoint of the current location.

(18)

An orientation of the additional virtual object as viewed from the viewpoint of the current location may be determined so as to represent an orientation of the other-location virtual object as viewed from the viewpoint of the current location.

With configuration (18) above, since the orientation of the other-location object as viewed from the viewpoint of the current location can be matched with the orientation of the additional object, the correspondence between the other-location object and the additional object can be made easier to understand.

(19)

The computer may determine whether an other-location virtual object is present for another location satisfying a predetermined condition with respect to the current location. If the other-location virtual object is present, the additional virtual object may be displayed on the display device together with the panoramic image.

With configuration (19) above, the additional object is displayed for the other-location object set in another location that satisfies a predetermined condition with respect to the current location. Therefore, it is possible to display an additional object for an appropriate other-location object, such as an other-location object placed in a location adjacent to the current location, for example.

(20)

The computer may not perform the predetermined information process even if the same condition as the predetermined condition is satisfied for the additional virtual object.

With configuration (20) above, additional objects can be placed without influencing the placement of the other-location objects on the map.

Note that the present specification discloses an example of a panoramic image display device and a panoramic image display system capable of performing operations equivalent to those performed by the computer executing the panoramic image display program of configurations (1) to (20). The present specification also discloses an example of a panoramic image display method to be carried out in configurations (1) to (20).

With the panoramic image display program, the panoramic image display device, the panoramic image display system, and the panoramic image display method, it is possible to provide highly-entertaining panoramic images by giving the user an interactive experience by using objects placed in locations on the map.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. Configuration of Information Processing System]

Figure 1:
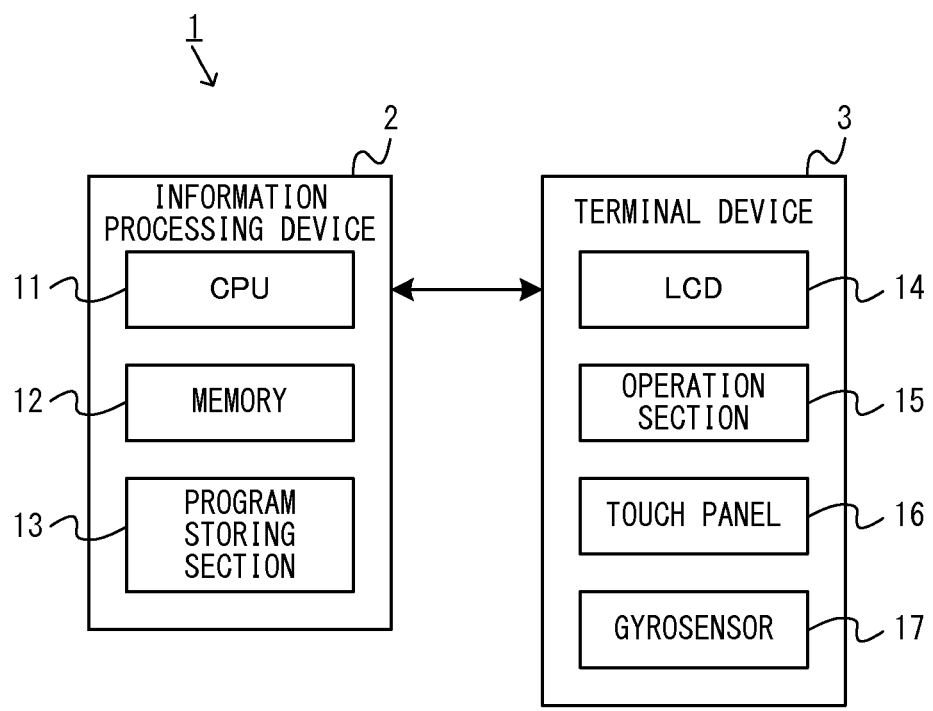
FIG. 1 is a block diagram showing an example of a display control system according to the present embodiment.

A panoramic image display system, a panoramic image display device, a panoramic image display program, and a panoramic image display method according to an example of the present embodiment will now be described. FIG. 1 is a block diagram showing an example of a panoramic image display system according to the present embodiment. In FIG. 1, an information processing system 1, an example of the panoramic image display system, includes an information processing device 2, and the terminal device 3. The information processing system 1 of the present embodiment displays panoramic images for a plurality of locations on a map on a display device (the terminal device 3).

The information processing system 1 includes the information processing device 2, an example of the panoramic image display device. The information processing device 2 performs information processes to be performed by the information processing system 1, such as a display control process for displaying a panoramic image on a display device. The information processing device 2 may be any form of an information processing device, such as a personal computer, a game device, a portable terminal, a smartphone, etc. The information processing device 2 is capable of communicating with the terminal device 3. The communication between the information processing device 2 and the terminal device 3 may be wired or wireless.

As shown in FIG. 1, the information processing device 2 includes a CPU 11, a memory 12, and a program storing section 13. The CPU 11 performs the display control process by performing a predetermined display control program, an example of the panoramic image display program, using the memory 12. Note that the information processing device 2 may be of any configuration as long as information processes can be performed, and some or all of the information processes may be performed by a dedicated circuit, for example. In the present embodiment, the information processing device 2 generates an image by the display control process, and the generated image is output from the information processing device 2 to the terminal device 3.

The program storing section 13 stores the display control program. The program storing section 13 may be any storage device accessible by the CPU 11. The program storing section 13 may be a storage section built in the information processing device 2, such as a hard disk, for example, or a storage section that can be attached/detached to/from the information processing device 2, such as an optical disc, for example.

Figure 2:
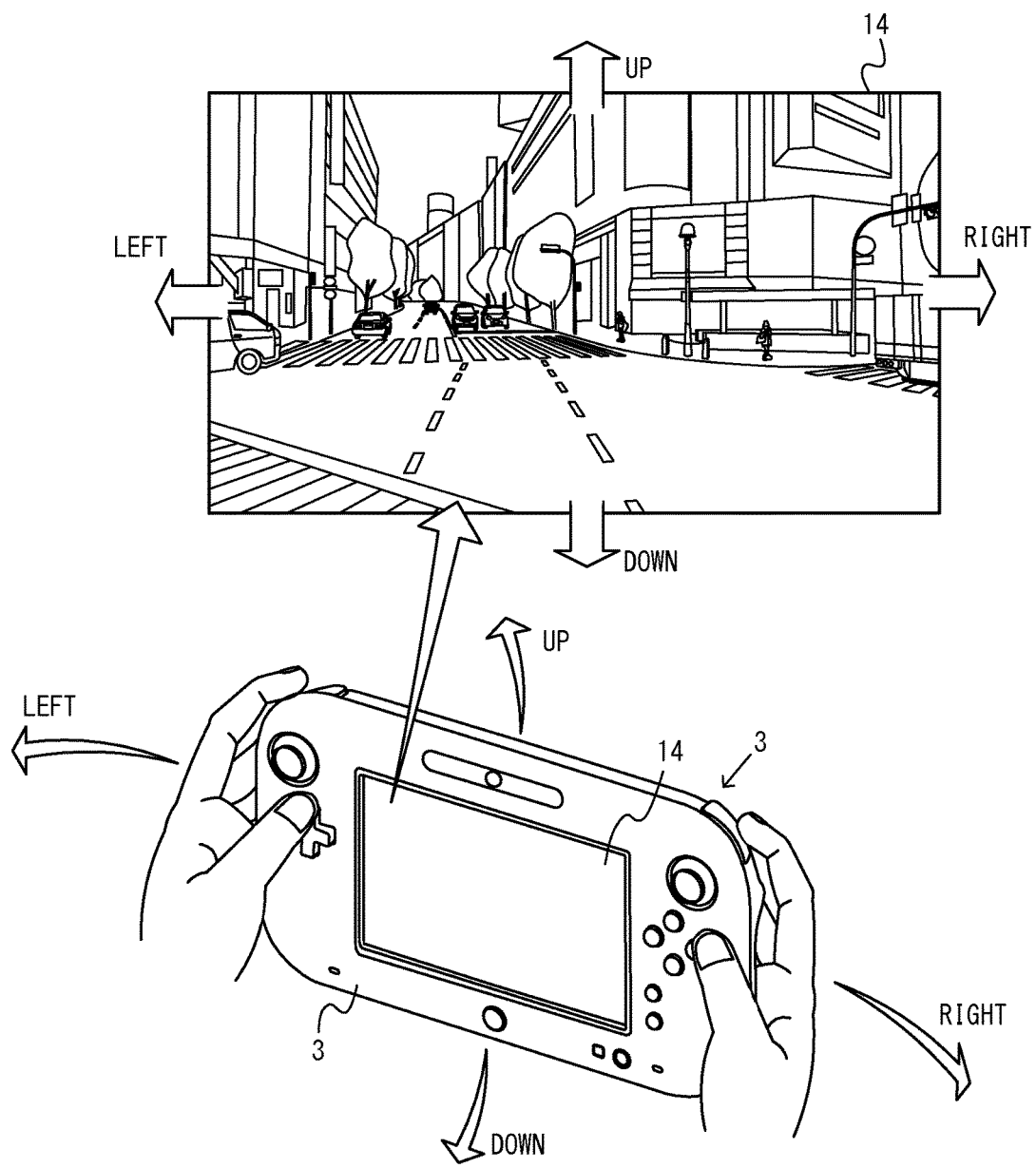
FIG. 2 is a diagram showing an example of a terminal device and an image displayed thereon.

The information processing system 1 includes the terminal device 3. Note that FIG. 2 shows an example of the terminal device 3. The terminal device 3 includes an LCD (liquid crystal display device) 14, which is an example of the display section. That is, the terminal device 3 can be said to be a display device. In the present embodiment, the terminal device 3 is a portable display device. The terminal device 3 receives an image transmitted from the information processing device 2, and displays the image on the LCD 14.

The terminal device 3 includes an input section. The input section may be any device for accepting a user operation, and generating operation data representing the user operation. In the present embodiment, the terminal device 3 includes, as the input section, an operation section 15, a touch panel 16, and a gyrosensor 17. The operation section 15 is a button and a stick in the present embodiment. The touch panel 16 is provided on the screen of the display section (LCD) 14. The gyrosensor 17 is an example of an attitude sensor for calculating the attitude of the terminal device 3. In other embodiments, for example, the terminal device 3 may include an acceleration sensor and/or a magnetic sensor in addition to the gyrosensor 17 (or instead of the gyrosensor 17). The method for calculating the attitude of the terminal device 3 may be any method, and in other embodiments, for example, the information processing device 2 may capture an image of the terminal device 3 using an image-capturing device, and calculate the attitude of the terminal device 3 using the captured image.

The terminal device 3 transmits the operation data generated by the input section to the information processing device 2. The operation data is repeatedly transmitted from the terminal device 3 to the information processing device 2 at a rate of once per a certain length of time, for example. The information processing device 2 performs the display control process using the operation data as an input.

In the information processing system 1, the information processing device 2 performs an information process (display control process) in response to an input made on the terminal device 3, and an image obtained as a result of the process is displayed on the terminal device 3. Thus, in the present embodiment, the information processing system 1 has a configuration in which the input function, the information processing function and the display function are implemented by a plurality of devices. Note that in other embodiments the information processing system 1 may be configured as a single information processing device having these functions (e.g., a portable information processing device such as a portable game device, a portable telephone, a smartphone, a tablet-type terminal, and a notebook-type personal computer, or a stationary-type information processing device such as a desktop-type personal computer). In other embodiments the function of the information processing device 2 may be implemented by a plurality of devices. In other embodiments, for example, at least some of the information processes performed on the information processing device 2 may be distributed among a plurality of devices capable of communicating with one another via a network (a wide area network and/or a local network).

In the present embodiment, the display device and the input device are configured as an integral terminal device 3. Note however that in other embodiments, the display device and the input device may be provided as separate components. For example, the information processing device 2 may display an image on a display device (e.g., a television capable of communicating with the information processing device 2) different from the terminal device 3.

[2. Display of Panoramic Image]

Next, an outline of the process of displaying an image according to the present embodiment will be described. In the present embodiment, the information processing system 1 displays an image of a partial area of a panoramic image (an area within a field-of-view range determined based on the line-of-sight direction operated by the user).

(Panoramic Image)

In the present embodiment, a panoramic image is an image of a range wider than the range displayed on the display device. That is, for a panoramic image, basically, an image of a partial area thereof is displayed on the display device. In the present embodiment, the range to be displayed on the display device (display range) is an area of the panoramic image that is included in the field-of-view range determined based on the line-of-sight direction. A panoramic image can also be said to be an image for which the process of determining the display range based on the line-of-sight direction in a three-dimensional space is performed (when being displayed on the display device). The display range may change (move) in accordance with the user operation, for example. When the display range moves, a panoramic image can also be said to be an image whose line-of-sight direction changes as a result of a change in the display range. While a panoramic image is normally an image of which a portion (range) is displayed as described above, the information processing system 1 may have the function of displaying the entire panoramic image on the display device. For example, where a plurality of display devices are used in the information processing system 1, the entirety of the panoramic image may be displayed on one or more of the display devices.

Note that the present embodiment uses a panoramic image having an omni-directional (360°) viewing angle for the up-down direction (pitch direction) and the left-right direction (yaw direction). Note however that the panoramic image may have a blind spot, and may have a viewing angle of about 180°, for example. An image of a range wider than the range displayed on the display device (the field-of-view range) is a panoramic image.

(Operation of Line-of-Sight Direction)

FIG. 2 is a diagram showing an example of the terminal device 3, and an image displayed thereon. As shown in FIG. 2, in the present embodiment, (a partial range) of a panoramic image representing the real world is displayed on the LCD 14 of the terminal device 3.

In the present embodiment, the line-of-sight direction is controlled through an operation in which the user changes the attitude of the terminal device 3. For example, as shown in FIG. 2, as the terminal device 3 rotates in the up-down direction (pitch direction) or the left-right direction (yaw direction), the line-of-sight direction of the image displayed on the LCD 14 (the line-of-sight direction of the virtual camera to be described later) changes up/down or left/right. That is, the image displayed on the LCD 14 is scrolled up/down or left/right to display a different range within the panoramic image. Specifically, the information processing system 1 calculates the attitude of the terminal device 3 based on the angular velocity detected by the gyrosensor 17, and calculates the line-of-sight direction based on the calculated attitude.

Thus, the information processing system 1 controls the line-of-sight direction based on the attitude of the terminal device 3. Thus, through an operation of changing the attitude of the terminal device 3 as if to look around, the user can change the display range of the panoramic image and look around the real space represented by the panoramic image, thus undergoing an experience as if the user were actually at the viewpoint of the panoramic image. Note that in the present embodiment, with the information processing system 1, the amount of change in the attitude of the terminal device 3 is equal to the amount of change in the line-of-sight direction of the panoramic image. Thus, there is an increased level of reality in the operation of looking around in the real space represented by the panoramic image by changing the attitude of the terminal device 3.

Note that in other embodiments, the line-of-sight direction may be controlled in any manner. Where the line-of-sight direction is controlled by a user's input, any method of input may be used. The information processing system 1 may control the line-of-sight direction based on an input on a cross-shaped button or a stick of the terminal device 3, for example. The line-of-sight direction may be controlled automatically in accordance with a predetermined algorithm, as well as being controlled by a user's input.

(Method of Displaying Panoramic Image)

In the present embodiment, the information processing system 1 sets a virtual three-dimensional space for displaying a panoramic image, and arranges a three-dimensional model in the three-dimensional space. Then, the information processing system 1 displays the panoramic image by the method of rendering a panoramic video as a texture on a three-dimensional model. The details will now be described.

Figure 3:
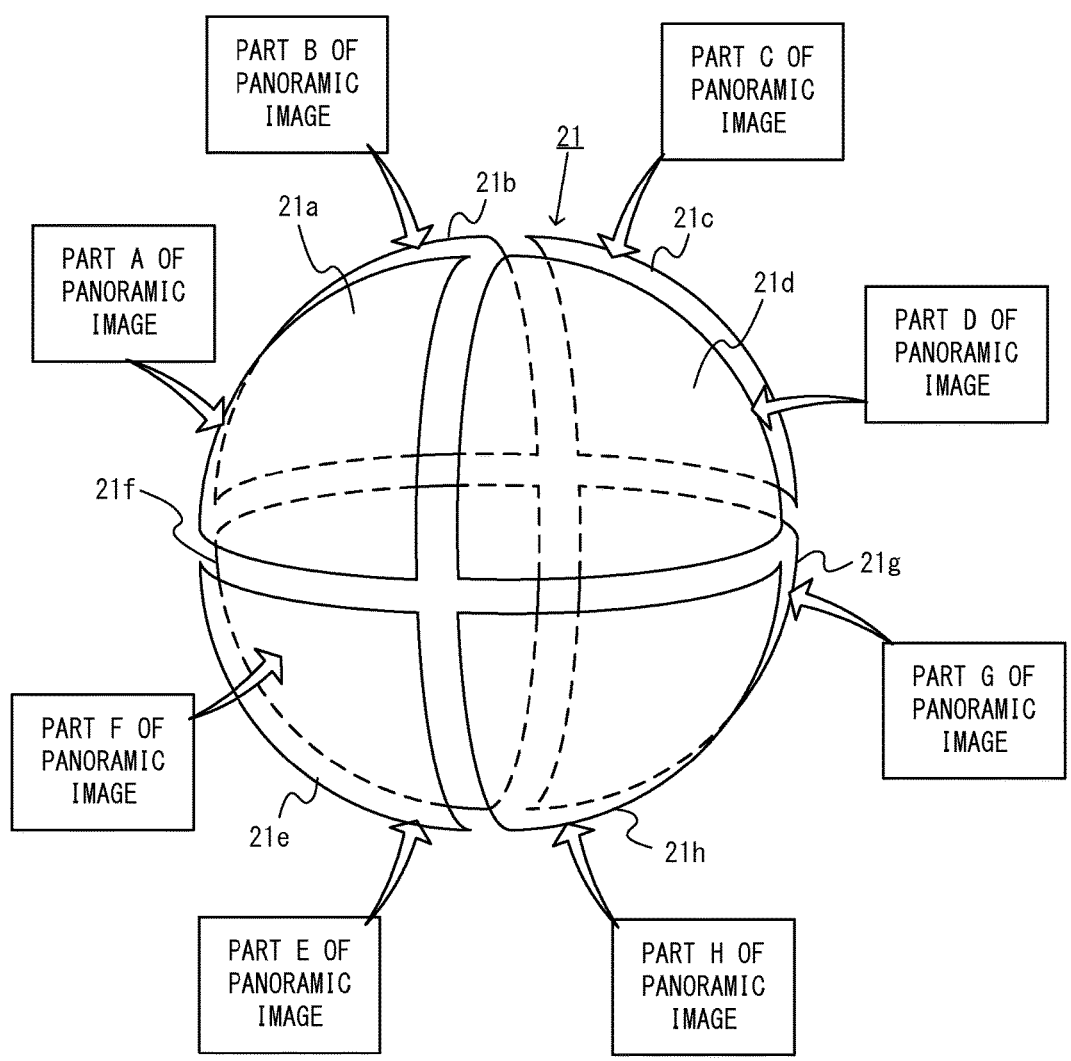
FIG. 3 is a diagram showing an example of a three-dimensional model arranged in a three-dimensional space.

FIG. 3 is a diagram showing an example of the three-dimensional model arranged in the three-dimensional space. As shown in FIG. 3, in the present embodiment, eight partial models 21a to 21h are arranged in the three-dimensional space, as three-dimensional models for rendering a panoramic image. Each of the partial models 21a to 21h has a curved surface shape that is a part of a spherical surface, and the partial models 21a to 21h form a sphere when being combined with each other. As shown in FIG. 3, the eight partial models 21a to 21h are spherically arranged.

On each of the partial models 21a to 21h, a part of the panoramic image is rendered. Here, the panoramic image is divided in accordance with the number of the partial models 21a to 21h. In the present embodiment, as shown in FIG. 3, the panoramic image is divided into eight parts A to H. Each part of the divided panoramic image is rendered on an inner surface of the corresponding partial model. In the present embodiment, as shown in FIG. 3, each of the parts A to H of the divided panoramic image is rendered on an inner surface of the corresponding partial model (one of the partial models 21a to 21h).

Figure 4:
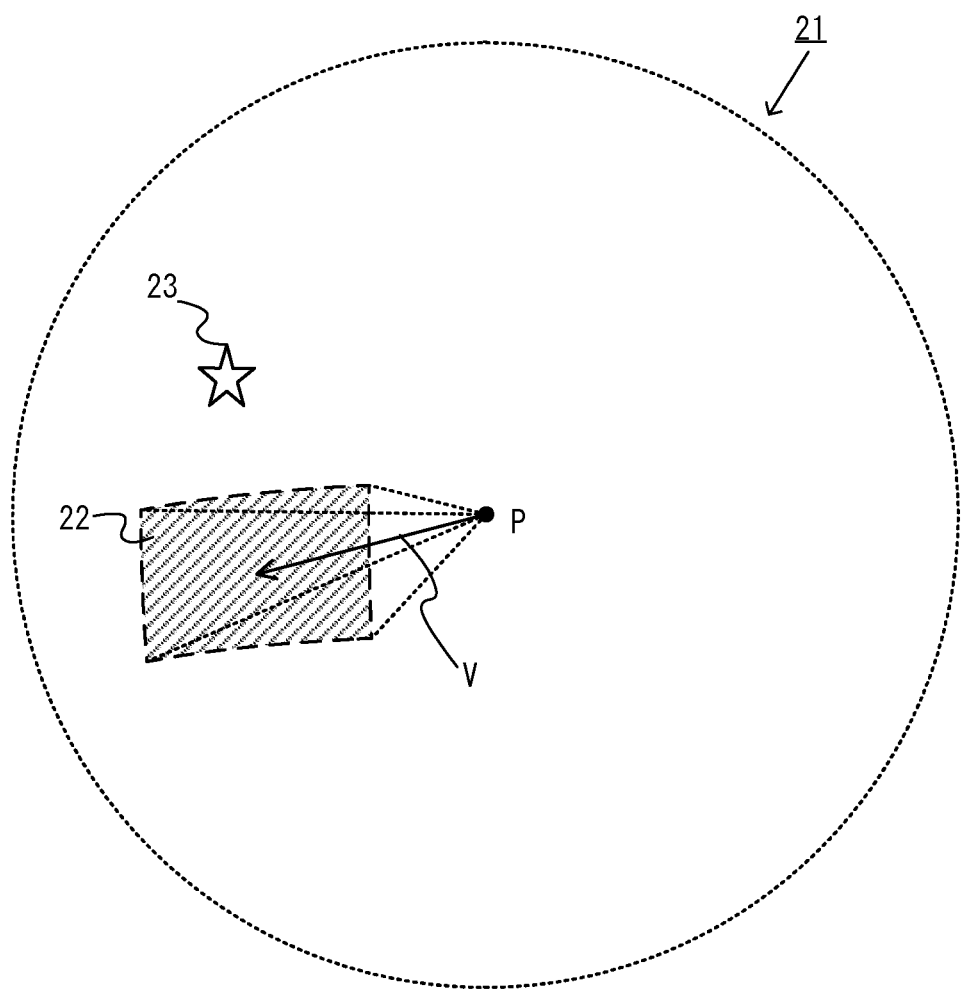
FIG. 4 is a diagram showing an example of a three-dimensional space set for displaying a panoramic image.

FIG. 4 is a diagram showing an example of the three-dimensional space set for displaying a panoramic image. It is noted that in the following, a model formed by the eight partial models 21a to 21h being spherically arranged is referred to as a "three-dimensional model 21". In addition, in FIGS. 4, 13 and 14, for the purpose of clarity of the drawings, the shape of each of the actually arranged partial models 21a to 21h is not shown, and the external shape of the three-dimensional model 21 formed by the partial models 21a to 21h is shown by a dotted line.

The information processing system 1 arranges a virtual camera inside the three-dimensional model 21. Here, as an example, the virtual camera is arranged at the center position P of the three-dimensional model 21. In addition, as described above, a line-of-sight direction V of the virtual camera is determined based on the attitude of the terminal apparatus 3. In the present embodiment, the position of the virtual camera is fixed, but in other embodiments, the position of the virtual camera may be changed based on the line-of-sight direction.

The information processing system 1 generates an image of the three-dimensional model 21 (the inner surface of the three-dimensional model 21) which is seen in the line-of-sight direction V from the position P of the virtual camera (viewpoint). In other words, the information processing system 1 generates an image in a field-of-view range, determined based on the line-of-sight direction V (a hatched area 22 shown in FIG. 4), of the three-dimensional space (three-dimensional model 21), and displays the image on the display device. Here, in generating an image, the information processing system 1 renders a panoramic image as a texture on the inner surface of the three-dimensional model 21 as described above. In other words, a part of a panoramic image is rendered on the inner surface of the three-dimensional model 21 (some of the partial models 21a to 21h) included in the field-of-view range, and the image in the field-of-view range is displayed. By so doing, of the panoramic image, an image in a range corresponding to the field-of-view range of the virtual camera is generated and displayed.

As described above, in the present embodiment, the line-of-sight direction V of the virtual camera is changed in response to a user operation. Accordingly, as the field-of-view range of the virtual camera changes in response to a user operation, the display range corresponding to the field-of-view range changes. In other words, the panoramic image displayed on the LCD 14 is scrolled in response to a user operation (see FIG. 3).

It is noted that the field-of-view range of the virtual camera is determined by any method based on the line-of-sight direction V. For example, the field-of-view range is determined so as to be a predetermined range centered at the line-of-sight direction V. The information processing system 1 may change the size of the field-of-view range. In other words, the information processing system 1 may zoom in or out on the panoramic image displayed on the LCD 14. The size of the field-of-view range may be changed, for example, in response to a user operation. The information processing system 1 may rotate the field-of-view range as the attitude of the terminal device 3 changes in the roll direction.

As shown in FIG. 4, an object 23 may be placed together with the three-dimensional model 21 in the virtual space (objects will later be described in detail). The object 23 is placed inside the three-dimensional model 21. Therefore, where the object 23 is located within the field-of-view range of the virtual camera, the object is displayed on the LCD 14, together with the panoramic image (superimposed on the panoramic image).

Note that the method for placing an object on a panoramic image is not limited to a method for placing an object inside the virtual space as in the present embodiment, but may be any other method. For example, in other embodiments, the information processing system 1 may place an object on a panoramic image by adding the image of the object to the panoramic image and rendering the panoramic image with the image of the object added thereto on the three-dimensional model 21.

In the present embodiment, an object placed on a panoramic image is provided in advance as is the panoramic image. That is, in the present embodiment, data of the panoramic image and data of the object (image data, etc., used for displaying the object) are stored in advance in the information processing device 2 or in an external server device capable of communicating with the information processing system 1. The information processing system 1 obtains these data as necessary, and displays the panoramic image and the object image on the LCD 14 using the obtained data. Note that data of the panoramic image and data of the object may be stored in different devices from each other. The object is not limited to those provided in advance, but may be one of those generated by the user. For example, the user may specify a position on the panoramic image, and the object may be placed at the specified position.

[3. Map Data Associated with Panoramic Image]

Next, map data to be used in the present embodiment will be described. In the present embodiment, the map data is provided, and a panoramic image is provided for each of a plurality of locations on a map represented by the map data. The user can display a plurality of panoramic images of different viewpoint positions by moving the location on the map, the details of which will be described later.

Figure 5:
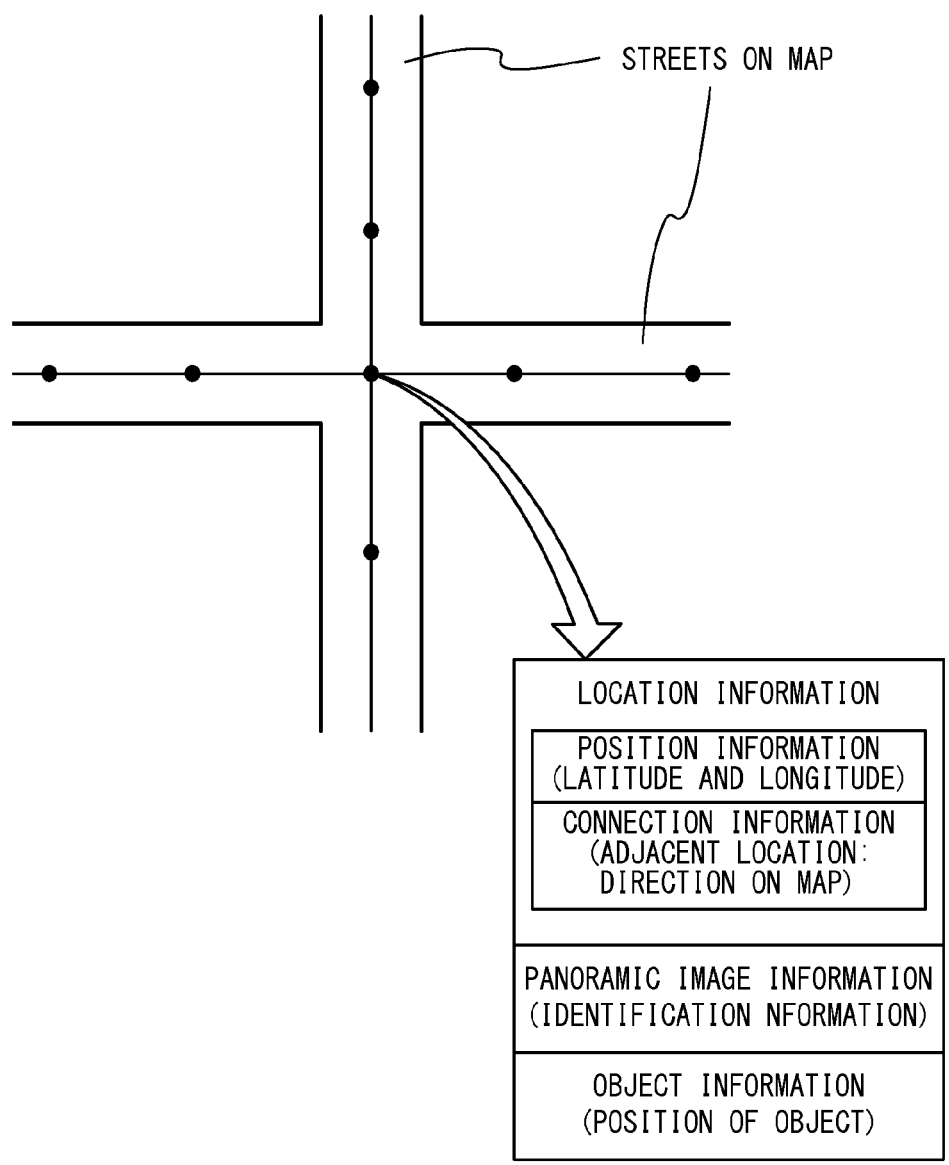
FIG. 5 is a diagram schematically showing an example of a configuration of map data.

FIG. 5 is a diagram schematically showing an example of a configuration of the map data. Each dot shown in FIG. 5 represents a location on the map that is associated with a panoramic image. Lines connecting the dots indicate that the locations connected with one another. Thus, the map data represents a plurality of locations on the map, and how the locations are connected with one another. The locations and how they are connected with one another in the map data may be represented by, for example, nodes representing the locations, and links connecting the nodes with one another.

As shown in FIG. 5, the map data stores, for each location, location information representing the location set on the map. In the present embodiment, the location information includes position information and connection information. The position information is information representing the position of the present location on the map. For example, position information represents the latitude and longitude on the map.

The connection information includes adjacency information representing another location (adjacent location) connected with the present location. The adjacency information may be information of a node representing an adjacent location, or may be information of a link representing the connection between the present location and the adjacent location. In the present embodiment, the connection information includes direction information representing a direction on the map of an adjacent location as viewed from the present location. The direction information represents an angle in the range of $0° \leq \theta < 360°$, with $0°$ being the north on the map.

In the present embodiment, each location is associated with a panoramic image. Specifically, panoramic image information is stored in the map data while being associated with location information (see FIG. 5). The panoramic image information is, for example, identification information (ID) with which it is possible to identify the panoramic image. Thus, in the present embodiment, a plurality of panoramic images are provided, and each panoramic image is associated with a location on the map. Note that a panoramic image associated with a certain location is a panoramic image obtained by capturing an image around a viewpoint, where the certain location is the viewpoint.

In the present embodiment, as shown in FIG. 5, an object is set for some of the panoramic images corresponding to the locations on the map (in other words, an object is set in some locations on the map). In the present embodiment, there are panoramic images for which an object is set, and panoramic images for which an object is not set.

Specifically, the object information is stored in the map data while being associated with the panoramic image information. The object information includes information representing a position of an object (position with respect to the position of the virtual camera) in the virtual space in which the three-dimensional model 21 is arranged. The object information may include information representing the orientation in which the object is placed, and/or the type or shape of the object. In the virtual space, the object may be placed fixedly, or may move in accordance with a predetermined algorithm. Where the object moves, the object information may include information representing an algorithm of movement (or a path of movement).

Note that the configuration of the map data is not limited to what is described above, and it may be any configuration where a panoramic image is associated with a location, and an object is set for at least one panoramic image. For example, in other embodiments, the map data may be configured to not include the direction information. The map data may further include information other than those specified above. For example, the map data may further include information regarding the altitude of locations. For example, where a location is set in a building on a map, the information regarding altitude is information representing the floor number of the location in the building. As described above, the location in the map data is not limited to a location on a street, but may also be a location in a building.

[4. Information Processes in Information Processing System]

(4-1: General Process Flow)

Figure 6:
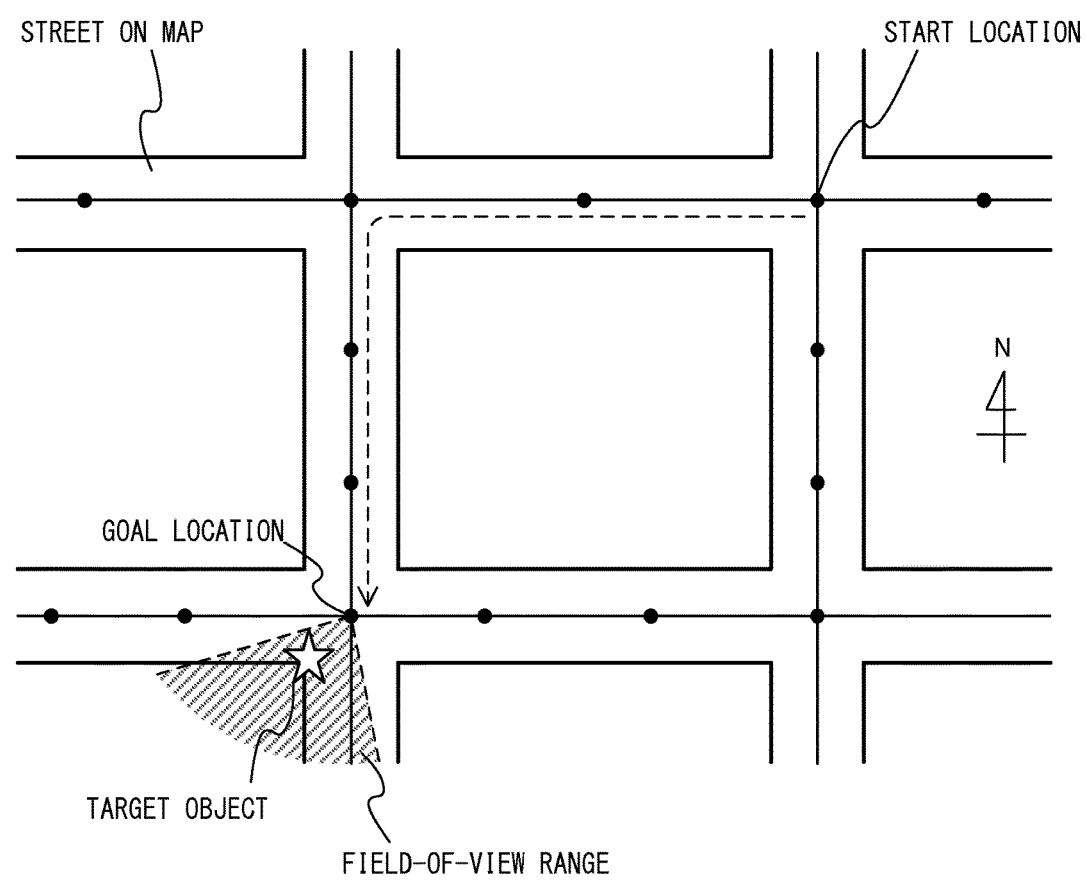
FIG. 6 is a diagram showing an example of a map.

Next, information processes to be performed by the information processing system 1 will be described. The present embodiment is directed to an example where a game is played, in which a user moves from one location to another on a map trying to find an object (target object) set in a location (a panoramic image associated with the location). FIG. 6 is a diagram showing an example of a map. In the game of the present embodiment, the objective is to move the viewpoint from the start location so as to arrive at the goal location, in which a target object is set, and find the target object (have the target object displayed on the screen).

Figure 7:
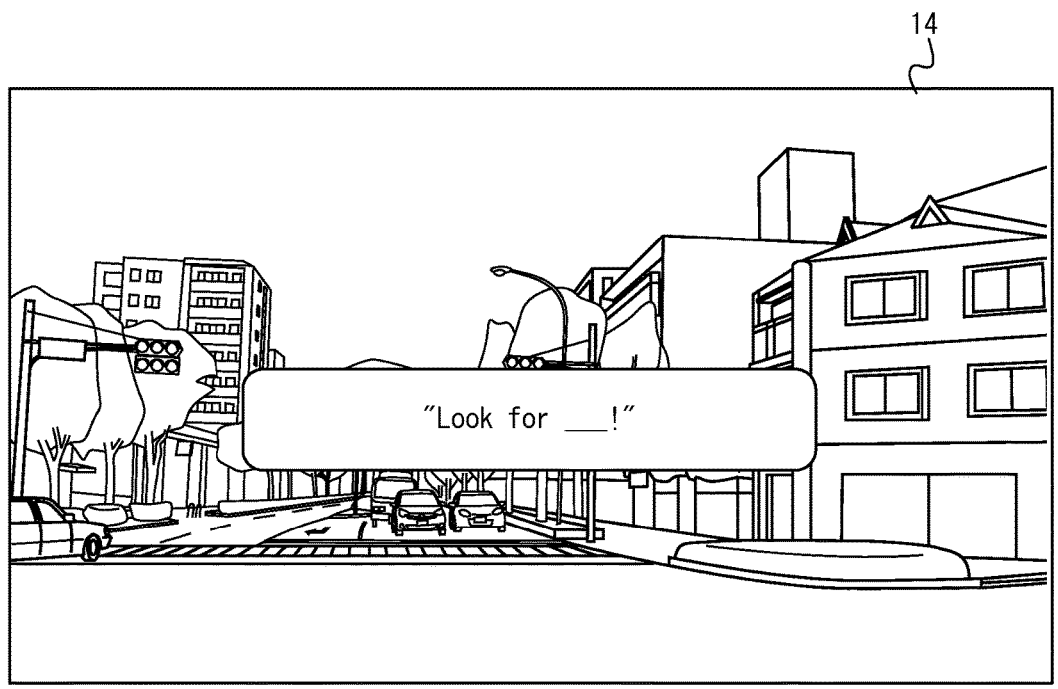
FIG. 7 is a diagram showing an example of an image displayed on a terminal device 3 at the start of the game.

FIG. 7 is a diagram showing an example of an image displayed on the terminal device 3 at the start of the game. As shown in FIG. 7, at the start of the game, a predetermined start location is set as the current location, and a portion of a panoramic image of the start location (a panoramic image associated with the start location) is displayed. A message "Look for _!" is displayed as a message to prompt the user to look for the target object. This message may be a message that gives a clue for finding the target object. For example, where the target object is placed near a convenient store, information suggesting the position of the placed object may be presented, such as a message "Look for a nearby convenient store".

During the game, the information processing system 1 accepts the line-of-sight direction changing operation and the location moving operation. The line-of-sight direction changing operation in the present embodiment is an operation of changing the attitude of the terminal device 3 described above. The location moving operation is an operation of moving the current location (viewpoint) of which the panoramic image is displayed. The specific method of the location moving operation may be any method. For example, the information processing system 1 may display a direction object indicating a direction in which movement can be made, together with the panoramic image, and accept an operation of specifying the direction object (e.g., an operation of touching the direction object on the screen). In this process, the current location moves in the direction indicated by the direction object specified by the user. The information processing system 1 may accept, as the location moving operation, an operation made on a cross-shaped button or a stick of the terminal device 3. Then, the current location moves in the direction specified by the cross-shaped button or the stick.

Figure 8:
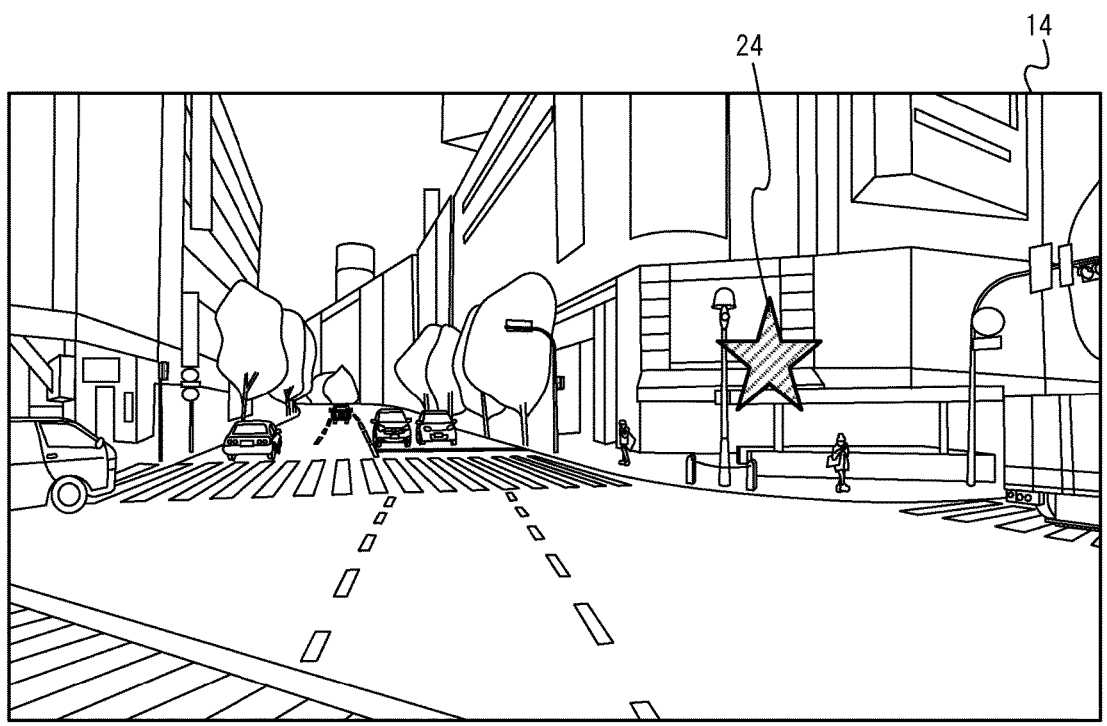
FIG. 8 is a diagram showing an example of an image where a target object is displayed together with a panoramic image.

As described above, the information processing system 1 displays the panoramic image on the LCD 14 while changing the display range in response to the line-of-sight direction changing operation. In response to the location moving operation, the information processing system 1 displays a panoramic image associated with the location after the movement. Note that in the present embodiment, the panoramic image to be rendered on the three-dimensional model 21 is changed, but not the position of the virtual camera, in response to the location moving operation. That is, the panoramic image of the location after the movement is rendered on the three-dimensional model 21 instead of the panoramic image of the location before the movement, thereby displaying the panoramic image of the location after the movement. Thus, to the user, the viewpoint appears to be moving.

Where an object is set for the panoramic image to be displayed, the information processing system 1 places an object (the target object, etc.) together with the three-dimensional model 21 in the virtual space. FIG. 8 is a diagram showing an example of an image where the target object is displayed together with the panoramic image. If a target object 24 is included within the field-of-view range while the panoramic image for which the target object 24 is set is displayed (a state where the location in which the target object is set is the current location), the target object 24 is displayed together with the panoramic image on the LCD 14 as shown in FIG. 8.

As described above, the user can perform the line-of-sight direction changing operation and the location moving operation. The user looks for the target object 24 by moving the current location (viewpoint) while changing the line-of-sight direction. In the present embodiment, since the user can move the viewpoint while looking around by changing the line-of-sight direction, the user can undergo an experience as if the user were looking for the target while actually walking around in the real space represented by the map.

In the present embodiment, in response to the user finding the target object 24, the game is considered cleared, thereby causing a predetermined information process to be performed. In the present embodiment, the predetermined information process is performed on the condition that the target object 24 has been displayed on the screen (i.e., on the condition that the target object 24 has been included within the field-of-view range). Note that the condition on which the predetermined information process is performed (the game clearing condition) may be any condition regarding the target object 24, the details of which will be described later.

In the present embodiment, an information process for awarding a predetermined bonus is performed as the predetermined information process. The bonus-awarding information process is, for example, a process of awarding a bonus regarding the panoramic image, e.g., a process of adding a recommended location, or a process of adding a new location (panoramic image). Note that in the present embodiment, where a recommended location has been registered, the current location can be moved to the recommended location by selecting the recommended location (without performing the location moving operation). The process of adding a recommended location is a process of newly registering a recommended location. The process of adding a new location is a process of adding, to the map data, a new location and a panoramic image associated therewith. This enables the user to move to a location, where the user has not been able to go, and view a panoramic image of that location. Note that the particulars of the information process may be arbitrary, and an information process to be described later in "(4-3: Predetermined information process)" may be performed in other embodiments.

As described above, in the present embodiment, the information processing system 1 determines, as the current location, one of the locations on the map based on a user operation. Where a predetermined object (the target object 24) is set for the panoramic image associated with the current location, the information processing system 1 places the object at a predetermined position of the panoramic image, and displays the image of a partial area of the panoramic image that is determined in response to a user operation on the terminal device 3. Then, where a panoramic image for which an object is set is displayed, the information processing system 1 performs a predetermined information process (a process of awarding a bonus) in response to satisfaction of a predetermined condition regarding the object (that the object has been displayed on the screen). As described above, the information process is performed when the condition regarding the object is satisfied as a result of the user changing the line-of-sight direction while moving the location. The user can not only view panoramic images, but also enjoy an interactive experience through finding objects. Therefore, the information processing system 1 can provide a highly-entertaining panoramic image.

(4-2: Condition Regarding Object)

Next, the condition regarding the object, i.e., the condition (execution condition) based on which the predetermined information process is performed, will be described. In the present embodiment, the predetermined information process is performed on the condition that the target object 24 is displayed on the display device. That is, the execution condition is met when the user has arrived at the location in which the target object 24 is set and, in addition, has directed the line-of-sight direction toward the target object 24.

Here, in the present embodiment, the current location having arrived at the goal location does not mean the target object 24 is always displayed. That is, the target object 24 is displayed together with the panoramic image on the condition that the line-of-sight direction is within a predetermined range. Therefore, the user cannot find the target object 24 only by moving the viewpoint, and the user is required to move the line-of-sight direction while moving the viewpoint. Thus, in the present embodiment, the content using panoramic images can be made more entertaining.

Note that in other embodiments, the information processing system 1 may perform the predetermined information process on the condition that the target object has been specified by the user. For example, the predetermined information process may be performed in response to a touch input having been made on the target object displayed on the screen. Then, it is possible to more reliably determine whether the user has discovered the object.

Note that the condition regarding the object is not limited to the condition described above, but may be any condition. For example, in other embodiments, the information processing system 1 may perform the predetermined information process on the condition that the panoramic image for which the target object is set has been displayed. That is, the execution condition may be a condition that the current location has arrived at the location in which the target object is set, even if the target object 24 is not actually displayed on the screen. Then, the satisfaction of the condition described above can be determined easily. As does the present embodiment, this also provides a game with an entertaining aspect, not seen with conventional techniques, that the user can look for a target while moving from one location to another on a map feeling as if the user were actually walking around a city.

While the present embodiment is directed to an example where one target object is set, there may be set a plurality of target objects. Then, the information processing system 1 performs the predetermined information process in response to satisfaction of the predetermined condition for the plurality of target objects. For example, where three target objects are set for different panoramic images (at different locations), the information processing system 1 may perform the predetermined information process when the execution condition is satisfied for the target objects. Then, the user performs operations while taking into consideration paths to take through different target object locations, for example, thereby improving the level of entertainment of the game.

(4-3: Predetermined Information Process)

In the present embodiment, the predetermined information process to be performed in response to satisfaction of the execution condition described above is a process of awarding a bonus as described above. Here, the particulars of the predetermined information process may be arbitrary. For example, in other embodiments, the predetermined information process may be a process of moving the current location to another location. That is, the information processing system 1 has a location associated with an object, the location being different from a location associated with a panoramic image for which the object is set. In response to satisfaction of the execution condition regarding the object (e.g., that the object displayed on the screen has been touched), the information processing system 1 selects a location associated with the object, a panoramic image associated with the selected location is displayed on the terminal device 3. That is, a panoramic image associated with the selected location is displayed on the terminal device 3, instead of displaying the panoramic image of the current location (the panoramic image for which the object is set). Then, by selecting the object displayed together with the panoramic image, the user can move the viewpoint to another location. Placing such an object makes it easier to move to a distant location on the map, and allows the user to feel as if the viewpoint warped, thus providing a highly-entertaining panoramic image.

In other embodiments, when the predetermined condition regarding the target object is satisfied, the information processing system 1 may change the manner in which the target object, for which the predetermined condition is satisfied, is displayed. Specifically, the target object may be erased, the color of the target object may be changed, or the shape of the target object may be changed. Then, it is possible to notify the user that the condition has been satisfied in an easy-to-understand manner. Where the target object is erased, it can be made to appear that the target object has been obtained in response to satisfaction of the predetermined condition. After the erasure, the panoramic image can be presented to the user in an easier-to-view manner.

(4-4: Suggestion Information)

In the present embodiment, the information processing system 1 displays suggestion information for suggesting the position of the target object (the position on the map, or the position on the panoramic image). A message of a clue described above is an example of the suggestion information. In the present embodiment, an object representing suggestion information (a suggestion object) is displayed together with a panoramic image, as well as a message of a clue. The suggestion object will now be described.

(Object Suggesting a Position of Target Object on Map)

Figure 9:
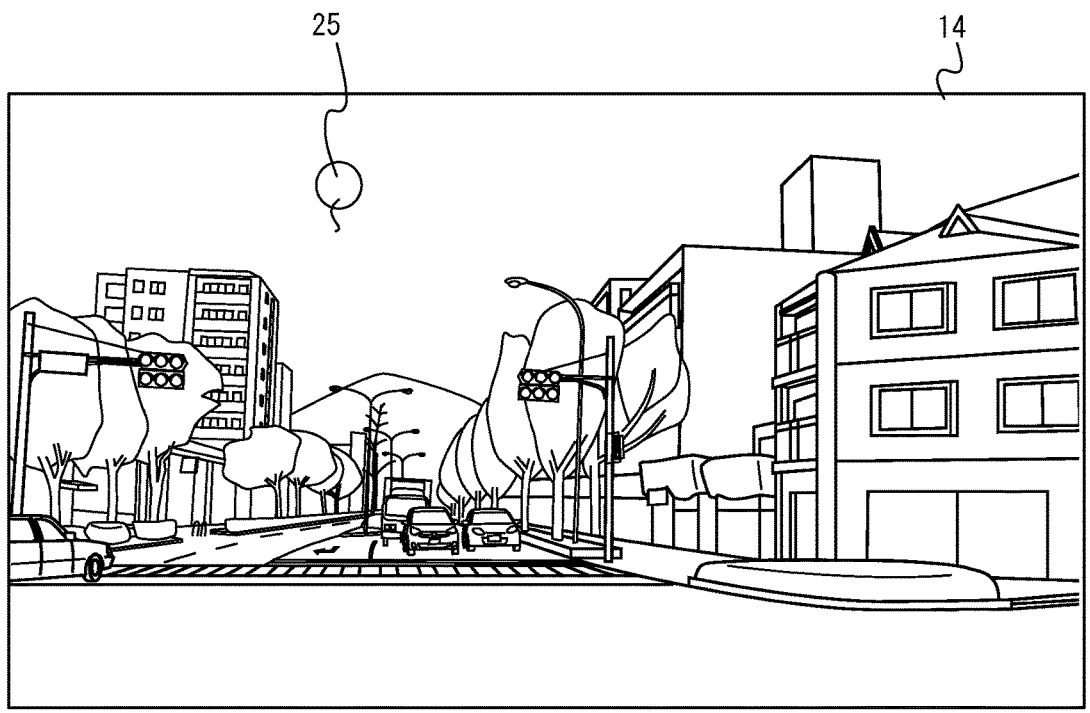
FIG. 9 is a diagram showing an example of a suggestion object.

FIG. 9 is a diagram showing an example of the suggestion object. Note that FIG. 9 is an image to be displayed where a panoramic image of the start location shown in FIG. 6 is displayed and where the line-of-sight direction is directed to the west (to the left in FIG. 6). Here, an example will be described where a target object is set in the goal location shown in FIG. 6.

In FIG. 9, a balloon-looking suggestion object 25 is displayed together with the panoramic image. The suggestion object 25 shown in FIG. 9 suggests a position (location) of the target object on the map. Specifically, the suggestion object 25 indicates the direction in which movement should be made in order to reach the location of the target object from the current location (the next location to go from the current location). The suggestion object 25 can also be said to be an object suggesting the path from the current location to the goal location. In FIG. 9, it is possible to move closer to the goal location by moving the location in the direction along the street displayed in the front direction on the screen of the LCD 14 (the west direction) (see the dotted-line path shown in FIG. 6). Therefore, the suggestion object 25 is displayed above the street, suggesting the direction of the street. Therefore, when the user finds such a suggestion object 25, the user can come closer to the goal location by moving in the direction suggested by the suggestion object 25.

In order to display the suggestion object 25, the information processing system 1 searches for a path from the current location to the goal location, and determines the direction to take, of all directions in which movement can be made, from the current location (in other words, the next location to go from the current location) based on the path. For example, in the example of FIG. 9, the direction to take is determined to be the west direction. Then, the information processing system 1 places the suggestion object 25 in the virtual space so that it is displayed at a position on the panoramic image corresponding to the determined direction. Thus, the suggestion object 25 can be placed at an appropriate position.

Note that the suggestion object 25 suggesting the position (location) of the target object on the map may indicate the direction on the map toward the position of the target object (goal location) from the current location, instead of the direction in which movement should be made from the current location. For example, in the example shown in FIGS. 6 and 9, the direction in which movement should be made from the current location is the west direction, but the direction on the map to the position of the target object from the current location is the south-west direction. Therefore, in the example shown in FIGS. 6 and 9, the suggestion object 25 may indicate the south-west direction. For example, in FIG. 9, the suggestion object 25 may be placed at a position in the south-west direction. Also in such a case, as in the present embodiment, the user can determine, from the suggestion object 25, the direction to take.

In order to display the suggestion object indicating the direction to the position of the target object from the current location, the information processing system 1 calculates the direction based on the current location and the position (latitude and longitude) of the goal location on the map. Then, the suggestion object is placed in the virtual space so that it is displayed at a position on the panoramic image corresponding to the calculated direction. Note that the position of the target object 24 on the map is slightly different from the position of the goal location (see FIG. 6). Therefore, the information processing system 1 may calculate the direction to the position of the target object 24 from the current location by using the positional relationship between the goal location and the target object 24 (the distance and direction from the goal location to the position of the target object 24), in addition to the positional relationship between the current location and the goal location. Note that the positional relationship between the goal location and the target object 24 on the map can be determined based on the positional relationship between the virtual camera and the target object 24 in the virtual space (the virtual space in which the three-dimensional model 21 is arranged).

As described above, the suggestion object 25 suggesting the position of the target object on the map is displayed at a position on the panoramic image determined based on the position of the target object on the map. Based on the display position of the suggestion object 25, the user can know the direction to take in order to move toward the target object 24.

The suggestion object 25 may be displayed in an arbitrary location other than the goal location in which the target object is set. The information processing system 1 may display the suggestion object 25 when a predetermined condition is satisfied. This predetermined condition may be a condition regarding the current location (e.g., that the current location is distant from the goal location by a predetermined reference or more, or that the current location is located within a predetermined reference from the goal location). The predetermined condition may be a condition regarding time (e.g., that a predetermined amount of time has passed since the start of the game). The information processing system 1 may determine whether or not to display the suggestion object 25 based on a user instruction.

(Object Suggesting Position of Target Object on Panoramic Image)

Figure 10:
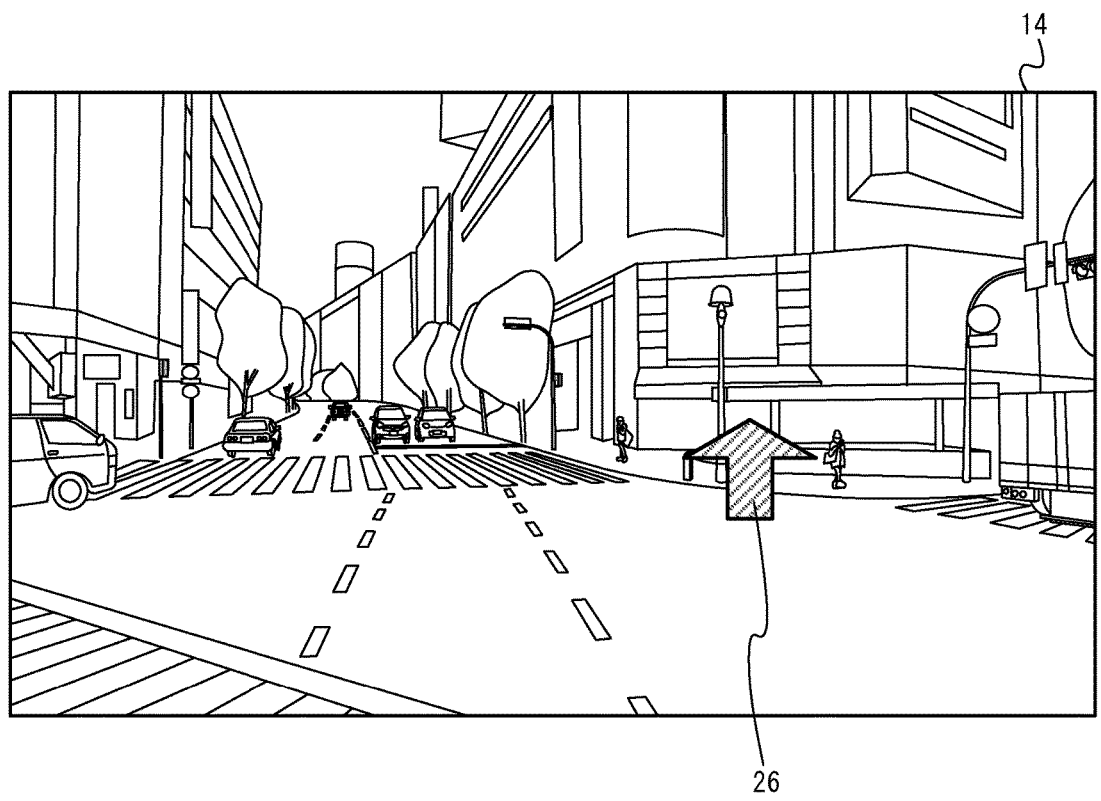
FIG. 10 is a diagram showing another example of a suggestion object.
Figure 11:
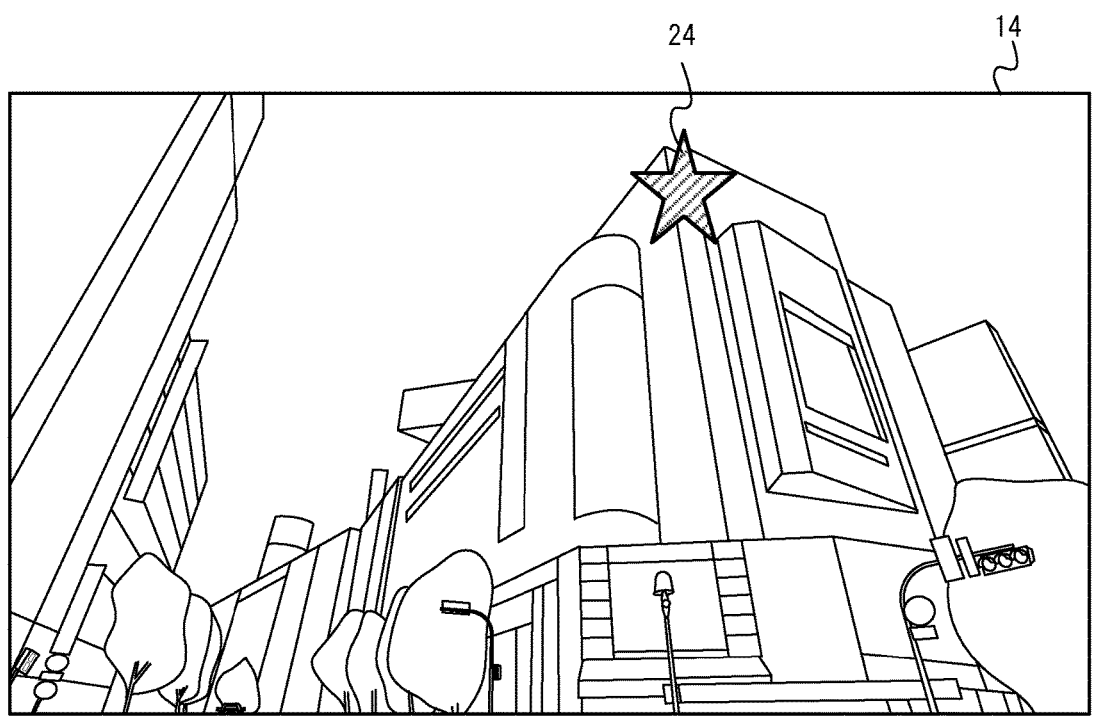
FIG. 11 is a diagram showing an example of a target object where the suggestion object shown in FIG. 10 is placed.

FIG. 10 is a diagram showing another example of the suggestion object. FIG. 11 is a diagram showing an example of the target object where a suggestion object shown in FIG. 10 is placed. The image shown in FIG. 10 and the image shown in FIG. 11 are of different ranges of the same panoramic image, wherein the display range shown in FIG. 11 is a display range obtained by directing the line-of-sight direction upward from the display range shown in FIG. 10.

In the example shown in FIGS. 10 and 11, a suggestion object 26 is an object indicating the direction (here, the upward direction), on the panoramic image, toward the target object 24 from the position of the suggestion object 26. That is, the suggestion object 26 suggests the position of the target object 24 on the panoramic image. Since the entire area of a panoramic image is not displayed at once, the user may not be able to find the target object 24 even after the viewpoint has arrived at the goal location. By placing the suggestion object 26, it is possible to give a clue to the target object 24, thereby improving the level of entertainment of the game. Note that it is believed that when the user views a panoramic image, the user has the line-of-sight direction generally horizontal most of the time. Therefore, if the target object 24 is placed at a relatively high position as in the example shown in FIGS. 10 and 11, it is hard for the user to find the target object 24. For this, the information processing system 1 can display the suggestion object 26 to make it easier to find the target object 24.

Where the suggestion object 26 described above is displayed, the information processing system 1 may set, in advance, a position where the suggestion object 26 is placed, and the direction represented by the suggestion object 26. The placement position of the suggestion object 26 on the panoramic image may be controlled to change based on the line-of-sight direction so that the suggestion object 26 is always displayed on the screen when the panoramic image for which the target object 24 is set is displayed. Then, the information processing system 1 may successively calculate the direction toward the target object 24 from the suggestion object 26, and change the orientation and/or shape of the target object 24 so that the target object 24 represents the calculated direction.

The suggestion object 26 may be displayed if an arbitrary condition is met (or always) while the panoramic image of the goal location in which the target object is set is displayed. For example, the suggestion object may be displayed when a condition regarding time is satisfied (e.g., that a predetermined amount of time or more has passed since the start of the game). For example, the suggestion object may be displayed when a condition regarding the line-of-sight direction is satisfied (e.g., that the line-of-sight direction is away from the direction of the target object 24 by a predetermined reference or more).

As described above, the suggestion object 26 suggesting the position of the target object 24 on the panoramic image may indicate the direction toward the target object 24 from the position of the suggestion object 26 on the panoramic image. With such a suggestion object 26, the user can know the direction in which the line-of-sight direction should be changed in order to have the target object 24 displayed.

Note that the suggestion object may be of any shape. For example, in other embodiments, the suggestion object indicating the direction in which movement should be made from the current location may be footprint-shaped objects placed in that direction.

(4-5: Additional Object)

Next, an additional object will be described. In the present embodiment, an additional object is an object representing the target object as viewed from a viewpoint of a location other than the goal location. In the present embodiment, in a location adjacent to the goal location in which the target object is set, an additional object representing the target object as viewed from the viewpoint of the current location is displayed together with the panoramic image (see FIG. 12). With the additional object, the user can recognize that the target object is placed in a location adjacent to the current location (that the adjacent location is the goal location). The details of the additional object will now be described.

Figure 12:
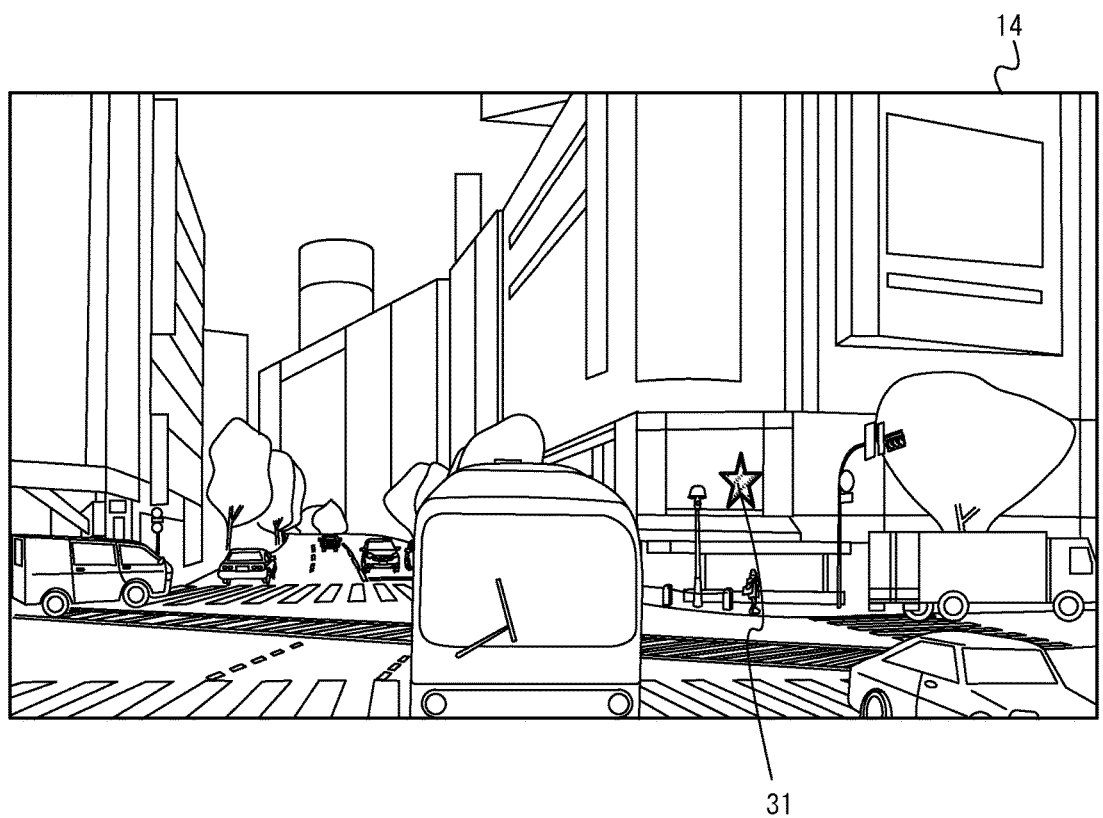
FIG. 12 is a diagram showing an example of an additional object displayed together with a panoramic image.

FIG. 12 is a diagram showing an example of the additional object displayed together with a panoramic image. The image shown in FIG. 12 is a panoramic image to be displayed at a location adjacent to the goal location in a case where the target object 24 is placed at the position shown in FIG. 8. As shown in FIG. 12, in the present embodiment, an additional object 31 is displayed so as to represent the target object 24 as viewed from the current location, i.e., so as to be at the position of the target object 24 as viewed from the current location. In the present embodiment, the additional object 31 has the same shape as the target object 24 (with a different orientation in FIG. 12). Note however that the additional object 31 does not always need to be of the same shape as the target object 24. The additional object 31 may have a shape related to the target object 24 (a shape with which the user can recognize the relation between the target object 24 and the additional object 31). Although the orientation (attitude) of the target object 24 and the orientation (attitude) of the additional object 31 displayed on the screen are different from each other in the present embodiment, their orientations may be equal to each other in other embodiments.

As described above, in the present embodiment, the information processing system 1 displays an additional object, representing the target object as viewed from the viewpoint of the panoramic image in the current location, together with the panoramic image associated with the current location on the terminal device 3. Here, in the present embodiment, the target object 24 is not displayed in another location other than the goal location. However, by displaying the additional object 31 in such a location, it is possible to notify the user that the target object 24 is set near the current location (herein, in an adjacent location) or notify the user of the position of the target object 24 on the map.

(Method for Placing Additional Object)

Figure 13:
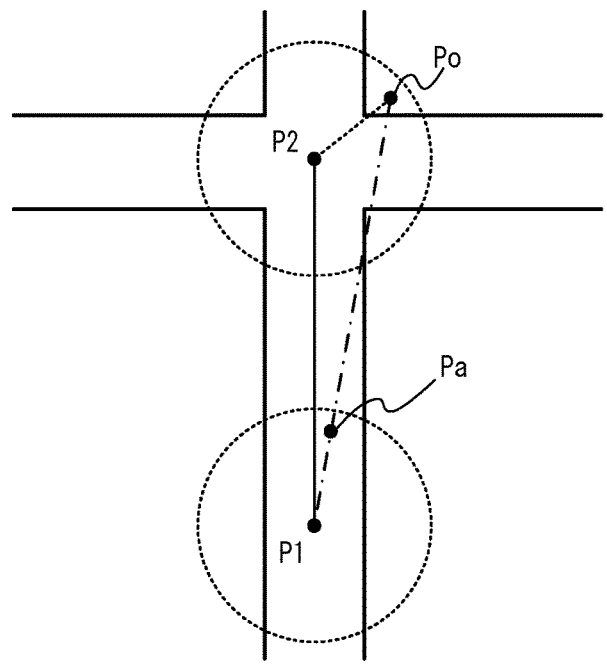
FIG. 13 is a diagram showing an example of a map space as viewed from above.
Figure 14:
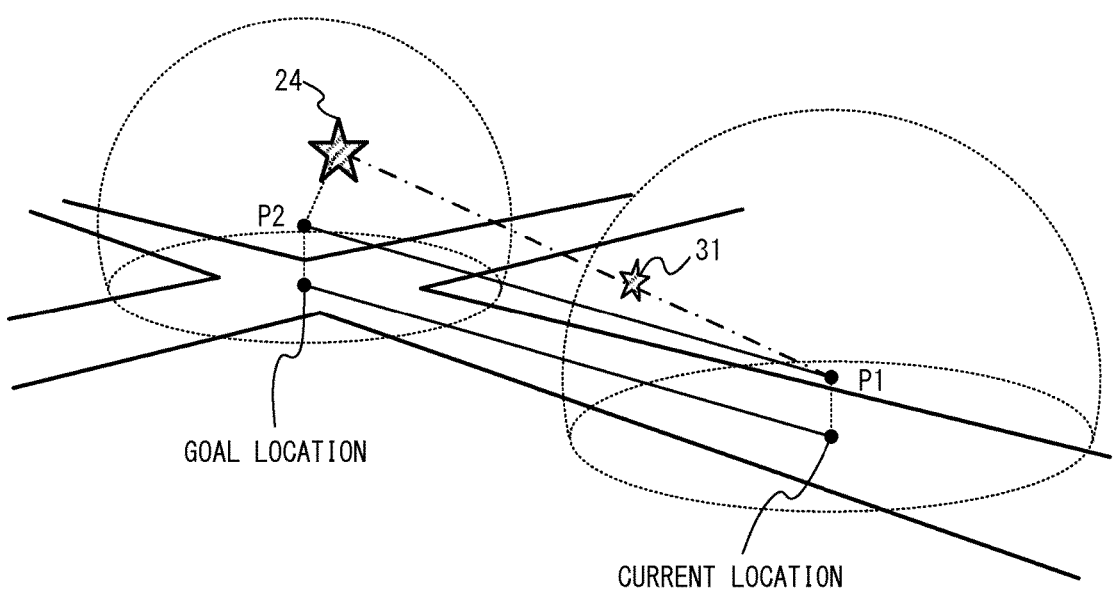
FIG. 14 is a diagram showing an example of the map space as viewed from a diagonal direction.

Referring to FIGS. 13 and 14, a method for placing an additional object will be described. FIGS. 13 and 14 are diagrams illustrating an example of a method for placing an additional object. FIG. 13 is a diagram showing an example of a space represented by the map (referred to as the "map space") as viewed from above, and FIG. 14 is a diagram showing an example of the map space as viewed from a diagonal direction. Note that the map space shown in FIGS. 13 and 14 is a conceptual representation of the space represented by the map, and is different from the virtual space constructed for displaying the panoramic image (the virtual space in which the three-dimensional model 21 is set). While FIGS. 13 and 14 show a spherical surface corresponding to the three-dimensional model 21 for ease of understanding, it should be noted that one three-dimensional model 21, but not a plurality of three-dimensional models 21, is arranged in the virtual space. Note however that in other embodiments, a virtual space corresponding to the map space may be set, and the three-dimensional model 21 may be set for each location.

In FIGS. 13 and 14, the position P1 is the position of the viewpoint of the current location (the position of the viewpoint of the panoramic image associated with the current location). The position P2 is the position of the viewpoint of the goal location (the position of the viewpoint of the panoramic image associated with the goal location). Note that it is assumed in the present embodiment that the positional relationship between the location and the viewpoint is constant throughout different panoramic images as shown in FIG. 14. That is, it is assumed in the present embodiment that the viewpoint is arranged a predetermined distance above the location.

As described above, in the present embodiment, where the current location is a location adjacent to the goal location, the process of placing an additional object is performed. In the process of placing an additional object, the information processing system 1 first calculates the positional relationship in the map space between the viewpoint position P1 in the current location and the viewpoint position P2 in the goal location (referred to as the "first positional relationship").

In the present embodiment, the distance and direction from the viewpoint position P1 to the viewpoint position P2 are calculated as the first relationship. Note that in the present embodiment, since the positional relationship between the location and the viewpoint is constant, the positional relationship between the current location and the goal location is, as it is, equal to the first positional relationship. Therefore, the information processing system 1 uses the direction represented by the direction information included in the map data as the direction from the viewpoint position P1 to the viewpoint position P2. In the present embodiment, the information processing system 1 uses a predetermined value as the distance from the viewpoint position P1 to the viewpoint position P2. Then, it is possible to increase the process speed. Note that in other embodiments, the distance may be calculated based on the latitude and longitude information of the current location and the goal location included in the map data. Then, it is possible to more accurately calculate the first positional relationship. In other embodiments, the positional relationship between the location and the viewpoint may be set for each location (for each panoramic image). Then, the information processing system 1 may calculate the first positional relationship based on the positional relationship set for each location, and the positional relationship between the current location and the goal location.

Next, the information processing system 1 determines the positional relationship in the map space between the viewpoint position P2 and the position Po of the target object 24 in the goal location (referred to as the second positional relationship"). In the present embodiment, the distance and direction from the viewpoint position P2 to the position Po are determined as the second positional relationship. The second positional relationship is determined based on the positional relationship between the virtual camera and the target object 24 in the virtual space in which the three-dimensional model 21 is set. Note that the positional relationship in the virtual space is set in advance when the target object 24 is set. Specifically, the direction from the viewpoint position P2 to the position Po in the map space is determined so as to correspond to (coincide with) the direction from the virtual camera to the target object 24 in the virtual space. The distance from the viewpoint position P2 to the position Po in the map space is determined so as to correspond to the distance from the virtual camera to the target object 24 in the virtual space. Note however that the method for determining the distance from the viewpoint position P2 to the position Po may be any method, and the distance may be set to a predetermined value.

Next, the information processing system 1 calculates the placement position Pa of the additional object 31 based on the first positional relationship and the second positional relationship. Specifically, the information processing system 1 calculates the direction from the viewpoint position P1 to the position Po (a direction along the one-dot-chain line shown in FIGS. 13 and 14) based on the first positional relationship and the second positional relationship. The position Pa of the additional object 31 is set along a straight line extended in this direction from the viewpoint position P1. Thus, the position Pa is determined as the distance from the viewpoint position P1 to the position Pa is determined by the following method.

Here, in the present embodiment, the additional object 31 is set so that the following two conditions are satisfied.

(Condition 1) that the size of the additional object 31 as viewed from the viewpoint position P1 is generally equal to the size of the target object 24 as viewed from the viewpoint position P1.

(Condition 2) that the position Pa is a position corresponding to an area inside the three-dimensional model 21.

Therefore, the information processing system 1 determines the distance from the viewpoint position P1 to the position Pa and the size of the additional object 31 so as to satisfy these two conditions. For example, the information processing system 1 may set the distance from the viewpoint position P1 to the position Pa to a predetermined value satisfying (Condition 2), and adjust the size of the additional object 31 so as to satisfy (Condition 1).

Note that where the position and the size of the additional object 31 are set so as to satisfy (Condition 1), the additional object 31 can be made to appear more realistic as the object representing the target object 24. For example, where the distance from the viewpoint position P1 to the position Po is longer than the distance from the viewpoint position P2 to the position Po as shown in FIG. 14, the additional object 31 is set so as to appear smaller than the target object 24. Note that (Condition 1) does not always need to be taken into consideration, but the additional object 31 may be set so as to satisfy only (Condition 2). For example, where the process speed is to be increased or where the additional object 31 will be too small if (Condition 1) is to be satisfied, for example, the additional object 31 may be set so as to satisfy only (Condition 2).

As described above, as the position Pa of the additional object 31 in the map space is calculated, the information processing system 1 places the additional object 31 at a position in the virtual space corresponding to the position Pa. Thus, the additional object 31 is displayed in the direction toward the position Po of the target object 24 as viewed from the viewpoint position P1 (see FIG. 12).

As described above, in the present embodiment, the information processing system 1 determines the placement position of the additional object 31 on the panoramic image associated with the current location based on the direction from the current location to another location (goal location) on the map. Then, based on the placement position of the additional object 31, the user can recognize the direction of the target object 24 as viewed from the current location.

Note that in other embodiments the placement position of the additional object 31 may be determined by using only the direction from the viewpoint position P1 to the viewpoint position P2 (without using the distance from the viewpoint position P1 to the viewpoint position P2 and the second positional relationship to be described later). Also in such a case, the user can recognize the general direction of the target object 24 as viewed from the current location, based on the placement position of the additional object 31. As described above, the additional object 31 does not always need to be placed at an accurate position corresponding to the target object 24, but may be placed so as to generally represent the direction from the current viewpoint to the target object 24.

In the present embodiment, the placement position of the additional object 31 is determined based on the positional relationship (second positional relationship) on the map between the viewpoint (the position P2) in another location and the target object 24 (the position Po), in addition to the direction from the current location to the other location (goal location) on the map. Then, with the placement position of the additional object 31, it is possible to more accurately express the direction of the target object 24 from the viewpoint of the current location.

Note that in other embodiments, the distance in the first positional relationship may be calculated based on the latitude and longitude information of the current location and the goal location included in the map data. That is, the placement position of the additional object 31 may be determined based on the distance from the current location to the other location calculated based on location's position information. Then, using the placement position of the additional object 31, it is possible to even more accurately express the direction of the target object 24 from the viewpoint of the current location.

The orientation (attitude) of the additional object 31 as viewed from the viewpoint position P1 in the current location is determined so as to represent the orientation of the target object 24 as viewed from the viewpoint position P1 (so as to coincide with the orientation of the target object 24 as viewed from the viewpoint position P1). Specifically, the information processing system 1 determines the orientation of the additional object 31 based on the angular difference between the direction toward the position Po of the target object 24 from the viewpoint position P1 and the direction toward the position Po from the viewpoint position P2. More specifically, the information processing system 1 sets the orientation of the additional object 31 to an orientation obtained by rotating the orientation of the target object 24 as viewed from the viewpoint position P2 by an amount determined based on the angular difference. Thus, by matching the orientation of the target object 24 as viewed from the viewpoint position P1 with the orientation of the additional object 31, the correspondence between the target object 24 and the additional object 31 can be made easier to understand. It is also possible to improve the reality of the target object 24 and the additional object 31. Note that in other embodiments, the orientation of the additional object 31 may be set to a predetermined orientation, or may be set to the same orientation as the orientation of the target object 24 as viewed from the viewpoint position P2, for example.

(Condition for Placing Additional Object)

As described above, in the present embodiment, the information processing system 1 determines whether the target object 24 is present in another location that satisfies a predetermined condition with respect to the current location, and if the target object 24 is present, displays the additional object 31 on the terminal device 3 together with the panoramic image. Thus, the information processing system 1 can display the additional object 31 when appropriate, e.g., when the target object 24 is present in a location adjacent to the current location, for example. Note that in the present embodiment, the predetermined condition is that it is adjacent to the current location. Here, in other embodiments, the predetermined condition may be any condition. For example, the predetermined condition may be that "it is within a predetermined distance from the current location".

In other embodiments, no predetermined condition may be set. That is, the information processing system 1 may (always) display the additional object 31 in any location other than the location in which the target object 24 is set.

In the embodiment described above, the placement position and the orientation of the additional object are determined each time the position of the viewpoint is changed and a new panoramic image is displayed. Here, in other embodiments, the additional object may be set in advance for panoramic images. That is, in other embodiments, information representing the placement position (and orientation) of the additional object may be stored in the map data while being associated with the panoramic image information. Then, the information processing system 1 displays the additional object together with the panoramic image using such information.

(Difference Between Additional Object and Target Object)

For the target object 24, the predetermined information process is performed in response to satisfaction of a predetermined condition regarding the target object 24 as described above. In contrast, the predetermined information process is not performed even when the same condition as the predetermined condition is satisfied for the additional object 31. Thus, in the present embodiment, the additional object 31 serves as a guide to an object in another location different from the current location, and does not have the same function as the object. As the additional object 31 has a different function from the target object 24, the additional object 31 can be placed without influencing the placement of the target object 24 on the map.

Note that in other embodiments, the additional object 31 may have the same function as the target object 24. That is, the information processing system 1 may perform the predetermined information process when the same condition as the predetermined condition set for an object in another location is satisfied for the additional object 31. For example, where a warp object for triggering a process of teleporting the viewpoint to another location, as the predetermined information process, is placed, the additional object may be displayed for the warp object. Then, if the additional object displayed on the screen is specified, the process of teleporting the viewpoint to another location may be performed similarly to when the warp object is specified.

Figure 15:
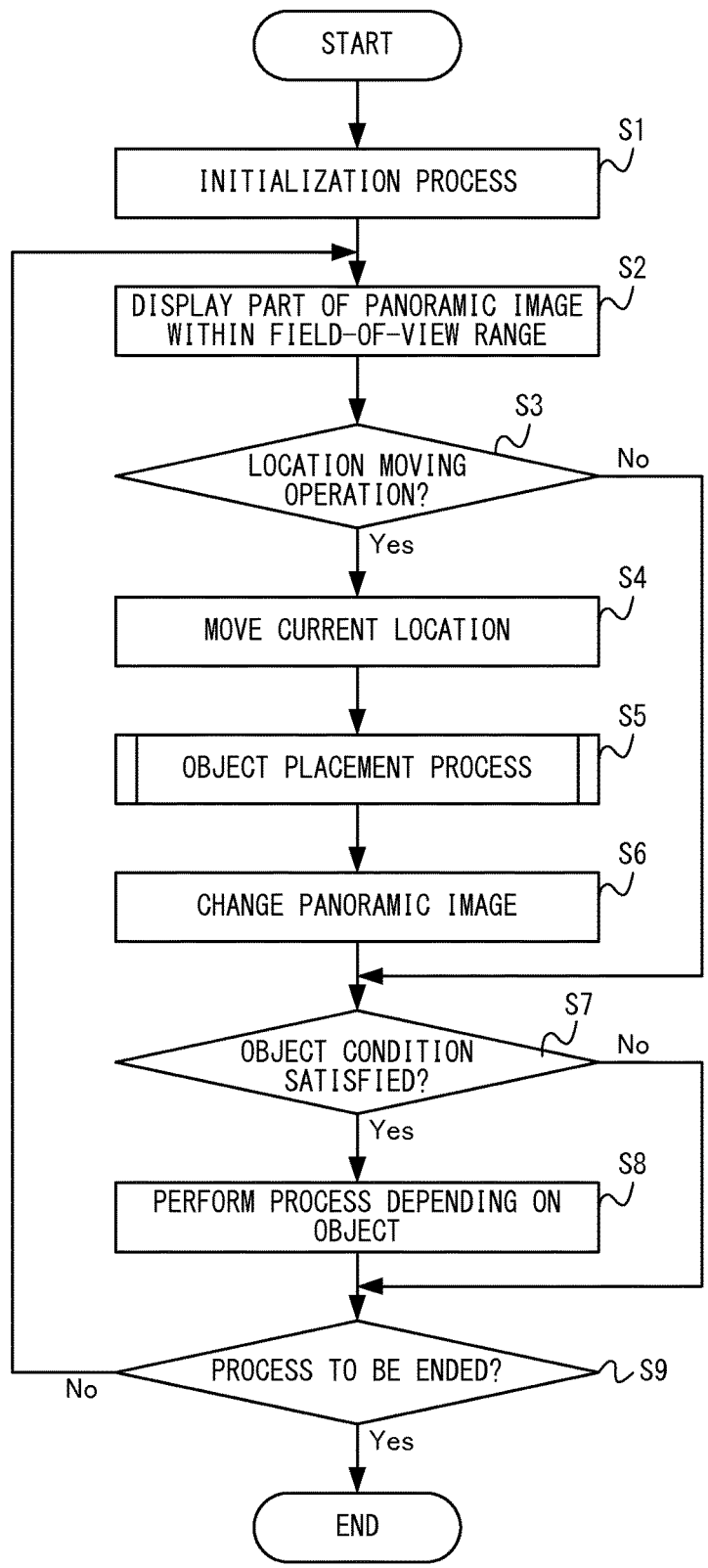
FIG. 15 is a flow chart showing an example of a flow of a display control process to be performed by an information processing device in the present embodiment.

[5. Details of display control process] A specific example of a display control process to be performed by the information processing system 1 (the information processing device 2) according to the present embodiment will now be described. FIG. 15 is a flow chart showing an example of the flow of the display control process to be performed by the information processing device 2 (the CPU 11) in the present embodiment. In the present embodiment, a series of processes shown in FIG. 15 are performed as the CPU 11 executes a display control program stored in the program storing section 13.

Note that the display control process shown in FIG. 15 may be started at any appropriate point in time. In the present embodiment, the execution of the display control program is started in response to a user's instruction to reproduce a panoramic image. At an appropriate point in time, part or whole of the display control program is loaded onto the memory 12 and executed by the CPU 11. Thus, the series of processes shown in FIG. 15 is started. Note that it is assumed that the display control program is pre-stored in the program storing section 13 in the information processing device 2. Note however that in other embodiments, it may be obtained from a storage medium that can be attached/removed to/from the information processing device 2 and stored in the memory 12, or it may be obtained from another device via a network such as the Internet and stored in the memory 12.

Note that the processes of the steps of the flow chart shown in FIG. 15 are merely illustrative, and the order of steps to be performed may be switched around, or other processes may be performed in addition to (or instead of) the processes of these steps, as long as similar results are obtained. While the present embodiment is described assuming that the processes of the steps of the flow chart are performed by the CPU, processes of some of the steps of the flow chart may be performed by a processor or a dedicated circuit other than the CPU.

In step S1 of the display control process, the CPU 11 performs an initialization process. In the present embodiment, as the initialization process, the CPU 11 performs the process of obtaining map data, and the process of obtaining the panoramic image of the start location. That is, first, the CPU 11 obtains map data. As described above, for each of a plurality of locations, the map data includes location information, panoramic image information, and as necessary, object information. The CPU 11 may obtain the map data from a storage section in the information processing device 2, may obtain the map data from a storage medium that can be attached/removed to/from the information processing device 2, or may obtain the map data obtained from another device via a network such as the Internet. The map data obtained at the start of the display control process may be the entirety of the map data, or may be only data for a partial area (e.g., an area around the start location). The obtained map data is stored in the memory 12.

The CPU 11 selects a start location, and obtains a panoramic image associated with the start location. As the start location, a predetermined location may be selected, or the start location may be selected in accordance with a user instruction from among a plurality of candidates. In this process, the CPU 11 stores data representing the selected start location in the memory 12 as the current location data. The panoramic image may be obtained from a storage section in the information processing device 2, may be obtained from a storage medium that can be attached/removed to/from the information processing device 2, or may be obtained from another device via a network such as the Internet. The CPU 11 places an object in the virtual space in which the three-dimensional model 21 is set, through a process similar to the object placement process (step S5) to be described below.

In step S2, the CPU 11 generates an image of the field-of-view range of the panoramic image determined based on the attitude of the terminal device 3, and displays the generated image on the LCD 14. In the present embodiment, the CPU 11 generates an image of the field-of-view range according to the method described above in "[2. Display of panoramic image]. As a specific process, the CPU 11 generates an image of the field-of-view range by using operation data transmitted from the terminal device 3, the panoramic image data obtained in step S1 or S6, object placement data to be described below, etc. Next, the CPU 11 outputs (transmits) the generated image to the terminal device 3 for displaying the image on the LCD 14. The terminal device 3 receives the generated image and displays the generated image on the LCD 14. Thus, a part of the panoramic image is displayed on the LCD 14.

In step S3, the CPU 11 determines whether the location moving operation described above in "(4-1: General process flow)" has been performed. This determination is made based on operation data transmitted from the terminal device 3. If the determination result of step S3 is affirmative, the process of step S4 is performed. On the other hand, if the determination result of step S3 is negative, the processes of steps S4 to S6 are skipped, and the process of step S7 to be described below is performed.

In step S4, the CPU 11 moves the current location. That is, a location that is connected with the current location in the direction specified in the location moving operation is set as the new current location. The CPU 11 stores, as current location data, data representing the new current location in the memory 12.

Figure 16:
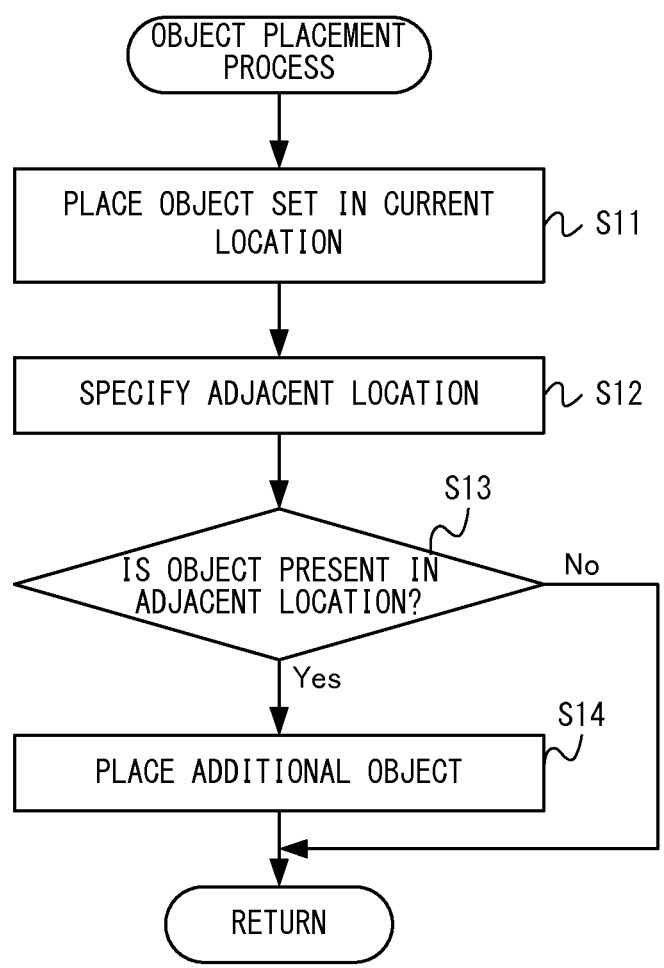
FIG. 16 is a flow chart showing an example of a detailed flow of an object placement process (step S5) shown in FIG. 15.

In step S5, the CPU 11 performs the object placement process. The object placement process is a process of placing, in the virtual space, an object to be displayed together with the panoramic image associated with the current location. Referring to FIG. 16, the details of the object placement process will now be described.

FIG. 16 is a flow chart showing an example of a detailed flow of the object placement process (step S5) shown in FIG. 15. In step S11 of the object placement process, the CPU 11 places an object set in the current location. In the present embodiment, the target object 24 and the suggestion objects 25 and 26 are placed as necessary. The target object 24 is placed by the method described above in "[3. Map data associated with panoramic image]" and "(4-1: General process flow)". The suggestion objects 25 and 26 are placed by the method described above in "(4-4: Suggestion information)". Note that the process of step S11 is skipped if there is no object to be placed (no object is set in the current location).

In step S12, the CPU 11 specifies a location adjacent to the current location (adjacent location). That is, the CPU 11 reads out the current position data and the map data from the memory 12, and specifies the adjacent location using the read-out data.

In step S13, the CPU 11 determines whether there is a target object in the adjacent location specified in step S12. This determination can be made based on whether object information is associated with the adjacent location by referring to the map data stored in the memory 12. If the determination result of step S13 is affirmative, the process of step S14 is performed. On the other hand, if the determination result of step S13 is negative, the process of step S14 is skipped, and the CPU 11 ends the object placement process.

In step S14, the CPU 11 places the additional object 31. The additional object 31 is placed by the method described above in "(4-5: Additional object)". After step S14, the CPU 11 ends the object placement process. Note that the CPU 11 stores, as the object placement data, data representing the object placed in the object placement process, and the position and the orientation (the position and the orientation in the virtual space) thereof, in the memory 12.

Referring back to FIG. 15, the process of step S6 is performed following the object placement process of step S5. In step S6, the CPU 11 changes the panoramic image to be displayed to the panoramic image associated with the current location. That is, the CPU 11 reads out the current location data and the map data from the memory 12, and obtains the panoramic image represented by the panoramic image information associated with the current location in the map data. In step S2 to be performed in the next iteration, the obtained panoramic image is rendered on the three-dimensional model 21. Thus, in step S2 to be performed in the next iteration, the panoramic image and the object in the location after the movement are displayed.

In step S7, the CPU 11 determines whether the condition regarding the target object has been satisfied. This determination is made by the method described above in "(4-2: Condition regarding object)". Specifically, the CPU 11 determines whether the target object 24 is included in the field-of-view range of the virtual camera by using data representing the line-of-sight direction calculated from the operation data and the object placement data. If the determination result of step S7 is affirmative, the process of step S8 is performed. On the other hand, if the determination result of step S7 is negative, the process of step S8 is skipped, and the process of step S9 is performed.

In step S8, the CPU 11 performs an information process depending on the target object 24 for which the condition has been satisfied, by using the memory 12. That is, the information process described above in "(4-3: Predetermined information process)" is performed.

In step S9, the CPU 11 determines whether or not to end the panoramic image display process. The specific method of this determination may be any method. For example, the CPU 11 determines that the display process is to be ended when the user gives an instruction to stop display, and determines that the display process is not to be ended when no such instruction is given by the user. If the determination result of step S9 is negative, the process of step S2 is performed again. Thereafter, the processes of steps S2 to S9 are repeatedly performed until it is determined in step S9 that the display process is to be ended. On the other hand, if the determination result of step S9 is affirmative, the CPU 11 ends the display control process shown in FIG. 15.

[6. Variations] (Variation Regarding Additional Object)

While the embodiment described above is directed to an example where the additional object 31 corresponding to the target object 24 is placed, the information processing system 1 may place an additional object for any object placed in the virtual space. That is, the object represented by the additional object may be any object, and is not limited to the target object 24 for which a predetermined information process is performed in response to satisfaction of a predetermined condition regarding the object. For example, in other embodiments, an additional object may be set for an object that is merely displayed together with a panoramic image. Specifically, where the user is allowed to make a comment on a panoramic image, an additional object may be set for an object representing the comment.

(Variation Regarding Target Object)

In the embodiment described above, a target object to be displayed together with a panoramic image is a virtual object (a virtual object representing an object in the virtual space). Here, in other embodiments, an object to be displayed together with a panoramic image is not limited to a virtual object, but may be an object representing the real space. For example, information processing system may place, as an object, an image representing the real space on a panoramic image.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

The embodiment described above can be used in a game system, a game device, a game program, etc., with the aim of presenting highly-entertaining panoramic images, for example.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium storing a panoramic image display program for execution on a computer of an information processing device for displaying, on a display, a plurality of panoramic images each associated with a different location on a map,
wherein a first virtual object is set as a first target object for a first panoramic image associated with a first location on the map and a second virtual object is set as a second target object for a second panoramic image associated with a second location on the map different from the first location,
the panoramic image display program, when executed, causing the computer to perform operations comprising:
determining, based on a user operation, one of the locations on the map as a current location; and
based on determining that the current location corresponds to the first location on the map,
placing the first target object at a first position on the first panoramic image;
placing an additional object corresponding to the second target object at a second position on the first panoramic image, wherein the additional object has a shape related to a shape of the second virtual object and the second position for the additional object on the first panoramic image is determined based on a direction from the first location to the second location;
displaying, on the display, based on a user operation, an image of a partial area of the first panoramic image; and
performing a first information process based on satisfaction of a first condition regarding the first target object while the first panoramic image for which the first target object is set is displayed.

2. The storage medium according to claim 1, wherein the operations performed by the computer further comprise obtaining panoramic image data provided in advance in the information processing device or another information processing device, obtaining virtual object data provided in advance in the information processing device or another information processing device, and displaying, on the display, the image of the partial area of the first panoramic image using at least the obtained panoramic image data.

3. The storage medium according to claim 1, wherein:
the first condition comprises a condition regarding multiple target objects.

4. The storage medium according to claim 1, wherein the first condition comprises the first target object being displayed on the display.

5. The storage medium according to claim 1, wherein the first condition comprises detecting an operation for specifying the first target object displayed on the display.

6. The storage medium according to claim 1, wherein the first condition comprises the first panoramic image for which the first target object is set being displayed.

7. The storage medium according to claim 1, wherein a virtual object set as a target object for a respective panoramic image is displayed together with the respective panoramic image on a condition that a line-of-sight direction corresponding to an area of the respective panoramic image to be displayed is a direction within a range of directions.

8. The storage medium according to claim 1, wherein the operations performed by the computer further comprise displaying suggestion information on the display together with the first panoramic image, wherein the suggestion information suggests a position of the first target object on the map or on a respective panoramic image.

9. The storage medium according to claim 8, wherein a suggestion object is displayed, as the suggestion information, at a position on the first panoramic image determined based on a position of the first target object on the map.

10. The storage medium according to claim 8, wherein:
a suggestion object suggesting a position of the first target object on the first panoramic image is displayed as the suggestion information; and
the suggestion object indicates a direction toward the first target object from a position of the suggestion object on the first panoramic image.

11. The storage medium according to claim 1, wherein the first target object is erased when a second condition regarding the first target object is satisfied.

12. The storage medium according to claim 1, wherein the first information process comprises a process of providing the user a bonus.

13. The storage medium according to claim 1, wherein:
the first target object is associated with a location different from a location associated with the first panoramic image for which the first target object is set; and
the first information process comprises selecting the different location associated with the first target object based on satisfaction of the first condition, and displaying, on the display, a panoramic image associated with the selected location instead of the first panoramic image.

14. The storage medium according to claim 1, wherein the operations performed by the computer further comprise determining a placement position of the first target object on the second panoramic image based on a direction toward the first location from the second location on the map.

15. The storage medium according to claim 14, wherein the placement position of the first target object on the second panoramic image is determined based on a positional relationship on the map between a viewpoint of the second location and a position of the first target object on the first panoramic image.

16. The storage medium according to claim 15, wherein the placement position of the first target object on the second panoramic image is determined based on a distance from the second location to the first location, wherein the distance is calculated based on information indicating positions of the second location and the first location on the map.

17. The storage medium according to claim 14, wherein an orientation of the first target object at the first position on the second panoramic image represents an orientation of the first target object as viewed from a viewpoint of the second location.

18. The storage medium according to claim 1, wherein a position for first target object on the second panoramic image corresponds to the first position for the first target object on the first panoramic image relative to a viewpoint associated with the second location.

19. A panoramic image display system comprising:
a display for displaying a plurality of panoramic images each associated with a different location on a map;
a memory for storing virtual object information, wherein a first virtual object is set as a first target object for a first panoramic image associated with a first location on the map and a second virtual object is set as a second target object for a second panoramic image associated with a second location on the map different from the first location; and
one or more processors configured to perform operations comprising:
determining, based on a user operation, one of the locations on the map as a current location;
based on determining that the current location corresponds to the first location on the map,
placing the first target object at a first position on the first panoramic image;
placing an additional object corresponding to the second target object at a second position on the first panoramic image, wherein the additional object has a shape related to a shape of the second virtual object and the second position for the additional object on the first panoramic image is determined based on a direction from the first location to the second location;
displaying, on the display, based on a user operation, an image of a partial area of the first panoramic image; and
performing a first information process based on satisfaction of a first condition regarding the first target object while the first panoramic image for which the first target object is set is displayed.

20. The panoramic image display system according to claim 19, wherein a position for first target object on the second panoramic image corresponds to the first position for the first target object on the first panoramic image relative to a viewpoint associated with the second location.

21. A panoramic image display device for displaying, on a display, a plurality of panoramic images each associated with a different location on a map,
wherein a first virtual object is set as a first target object for a first panoramic image associated with a first location on the map and a second virtual object is set as a second target object for a second panoramic image associated with a second location on the map different from the first location, and
one or more processors of the panoramic image display device are configured to execute:
determining, based on a user operation, one of the locations on the map as a current location;
based on determining that the current location corresponds to the first location on the map,
placing the first target object at a first position on the first panoramic image;
placing an additional object corresponding to the second target object at a second position on the first panoramic image, wherein the additional object has a shape related to a shape of the second virtual object and the second position for the additional object on the first panoramic image is determined based on a direction from the first location to the second location;
displaying, on the display, based on a user operation, an image of a partial area of the first panoramic image; and
performing a first information process based on satisfaction of a first condition regarding the first target object while the first panoramic image for which the virtual object is set is displayed.

22. The panoramic image display device according to claim 21, wherein a position for first target object on the second panoramic image corresponds to the first position for the first target object on the first panoramic image relative to a viewpoint associated with the second location.

23. A panoramic image display method for carrying out on an information processing system for displaying, on a display, a plurality of panoramic images each associated with a different location on a map,
wherein a first virtual object is set as a first target object for a first panoramic image associated with a first location on the map and a second virtual object is set as a second target object for a second panoramic image associated with a second location on the map different from the first location,
the method comprising:
determining, based on a user operation, one of the locations on the map as a current location;
based on determining that the current location corresponds to the first location on the map,
placing the first target object at a first position on the first panoramic image;
placing an additional object corresponding to the second target object at a second position on the first panoramic image, wherein the additional object has a shape related to a shape of the second virtual object and the second position for the additional object on the first panoramic image is determined based on a direction from the first location to the second location;
displaying, on the display, based on a user operation, an image of a partial area of the first panoramic image; and
performing a first information process based on satisfaction of a first condition regarding the first target object while the first panoramic image for which the virtual object is set is displayed.

24. The panoramic image display method according to claim 23, wherein a position for first target object on the second panoramic image corresponds to the first position for the first target object on the first panoramic image relative to a viewpoint associated with the second location.

* * * * *

UNITED STATES PATENT AND TRADEMARK OFFICE
CERTIFICATE OF CORRECTION

PATENT NO. : 9,904,982 B2
APPLICATION NO. : 14/282710
DATED : February 27, 2018
INVENTOR(S) : Suzuki et al.

It is certified that error appears in the above-identified patent and that said Letters Patent is hereby corrected as shown below:

On the Title Page

Item [54], the title should read SYSTEMS AND METHODS FOR DISPLAYING PANORAMIC CONTENT Signed and Sealed this
Fifteenth Day of May, 2018

Andrei Iancu
*Director of the United States Patent and Trademark Office*